(12) United States Patent
Fukaya et al.

(10) Patent No.: US 10,978,752 B2
(45) Date of Patent: Apr. 13, 2021

(54) SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Taro Fukaya, Tokyo (JP); Takashi Kishi, Yokosuka (JP); Kazuki Ise, Kawasaki (JP); Kazuomi Yoshima, Yokohama (JP); Yasunobu Yamashita, Tokyo (JP); Yasuhiro Harada, Isehara (JP); Norio Takami, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/122,126

(22) Filed: Sep. 5, 2018

(65) Prior Publication Data

US 2019/0288348 A1   Sep. 19, 2019

(30) Foreign Application Priority Data

Mar. 19, 2018 (JP) .............................. JP2018-050665
Aug. 31, 2018 (JP) .............................. JP2018-162815

(51) Int. Cl.
*H01M 10/00* (2006.01)
*H01M 10/44* (2006.01)
(Continued)

(52) U.S. Cl.
CPC ......... *H01M 10/441* (2013.01); *H01M 4/366* (2013.01); *H01M 4/485* (2013.01);
(Continued)

(58) Field of Classification Search
CPC ..................... H01M 10/0525; H01M 10/0564
See application file for complete search history.

(56) References Cited

U.S. PATENT DOCUMENTS 9,793,547 B2   10/2017 Yamaguchi
2008/0166637 A1*   7/2008 Inagaki ................ H01M 4/366
429/329
(Continued)

FOREIGN PATENT DOCUMENTS

JP   2007-242411   9/2007
JP   2012-182130   9/2012
(Continued)

OTHER PUBLICATIONS

Izumi Nakai, et al., "Of the powdery X-rays analysis Actually—Introduction to lied belt method," Japan Society for Analytical Chemistry X-rays analysis study round-table conference, 2002, 59 Pages (with English Translation).

*Primary Examiner* — Milton I Cano
*Assistant Examiner* — Mary G Henshaw
(74) *Attorney, Agent, or Firm* — Oblon, McClelland, Maier & Neustadt, L.L.P.

(57) ABSTRACT

According to one embodiment, a secondary battery is provided. The secondary battery includes a negative electrode. The negative electrode includes an active material composite. The active material composite includes active material particles and a layer covering at least a portion of surfaces of the active material particles. The active material particles include titanium-containing oxide particles. The layer contains N and Si. The layer includes a first surface facing the at least the portion of surfaces of the active material particles and a second surface defining a layer thickness from the first surface. An N concentration in the layer decreases from the
(Continued)

first surface to the second surface. A Si concentration in the layer increases from the first surface to the second surface.

14 Claims, 9 Drawing Sheets

(51) Int. Cl.
*H01M 4/66* (2006.01)
*H01M 10/42* (2006.01)
*H01M 10/0525* (2010.01)
*H01M 10/0567* (2010.01)
*H01M 4/36* (2006.01)
*H01M 4/485* (2010.01)

(52) U.S. Cl.
CPC ....... *H01M 4/662* (2013.01); *H01M 10/0525* (2013.01); *H01M 10/0567* (2013.01); *H01M 10/425* (2013.01)

(56) References Cited

U.S. PATENT DOCUMENTS

| 2011/0027663 | A1 | 2/2011 | Ohkubo et al. |
| 2013/0029219 | A1 | 1/2013 | Inagaki et al. |
| 2015/0311564 | A1 | 10/2015 | Ishiji |
| 2016/0027592 | A1 | 1/2016 | Shimamoto et al. |
| 2016/0248121 | A1 | 8/2016 | Uematsu et al. |
| 2019/0393552 | A1* | 12/2019 | Kono ................ H01M 10/0525 |

FOREIGN PATENT DOCUMENTS

| JP | 5429631 | 2/2014 |
| JP | 2014-116326 | 6/2014 |
| JP | 2017-199548 | 11/2017 |
| JP | 2019-79692 A | 5/2019 |
| WO | WO 2011/125180 A1 | 10/2011 |
| WO | WO 2014/163055 A1 | 10/2014 |

\* cited by examiner

Distance from second surface

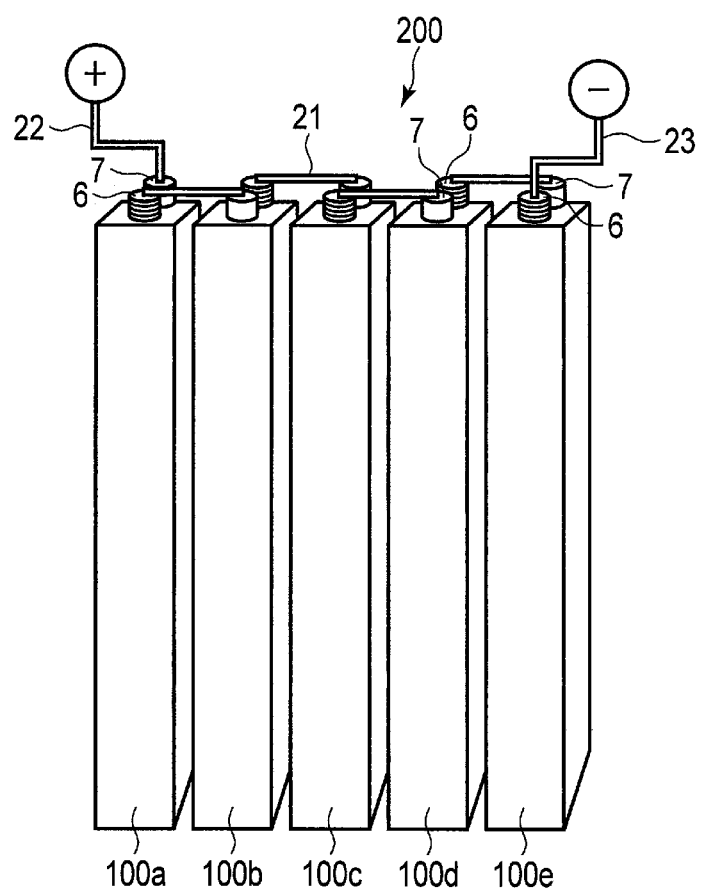
F I G. 8

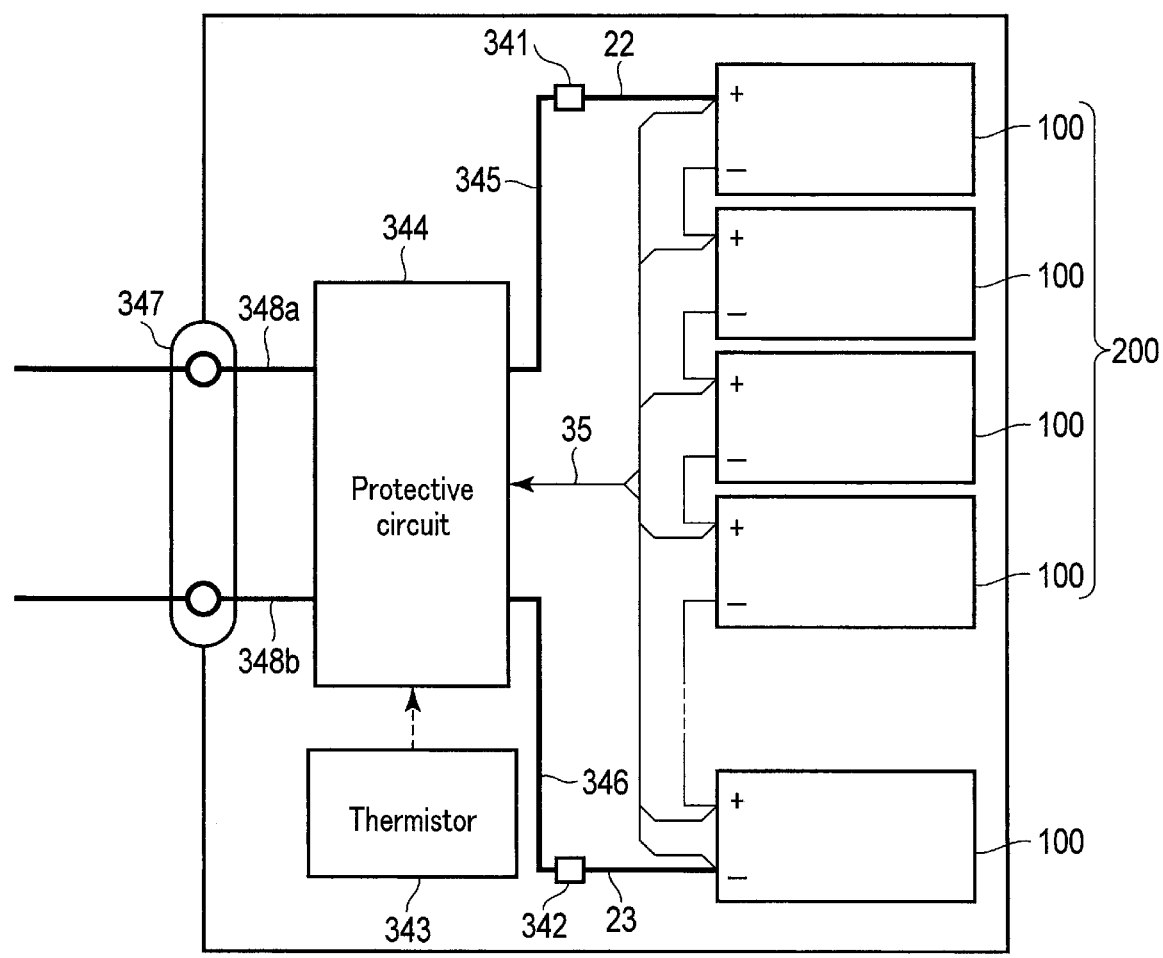
F I G. 10
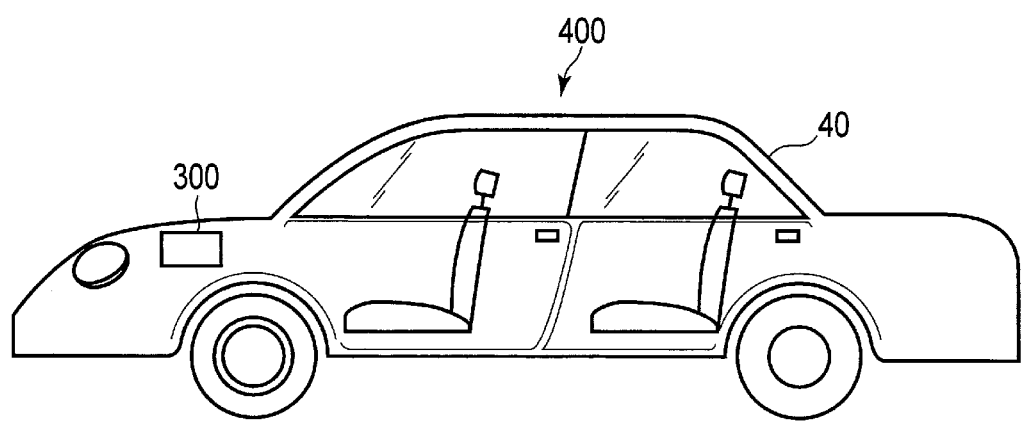
F I G. 11

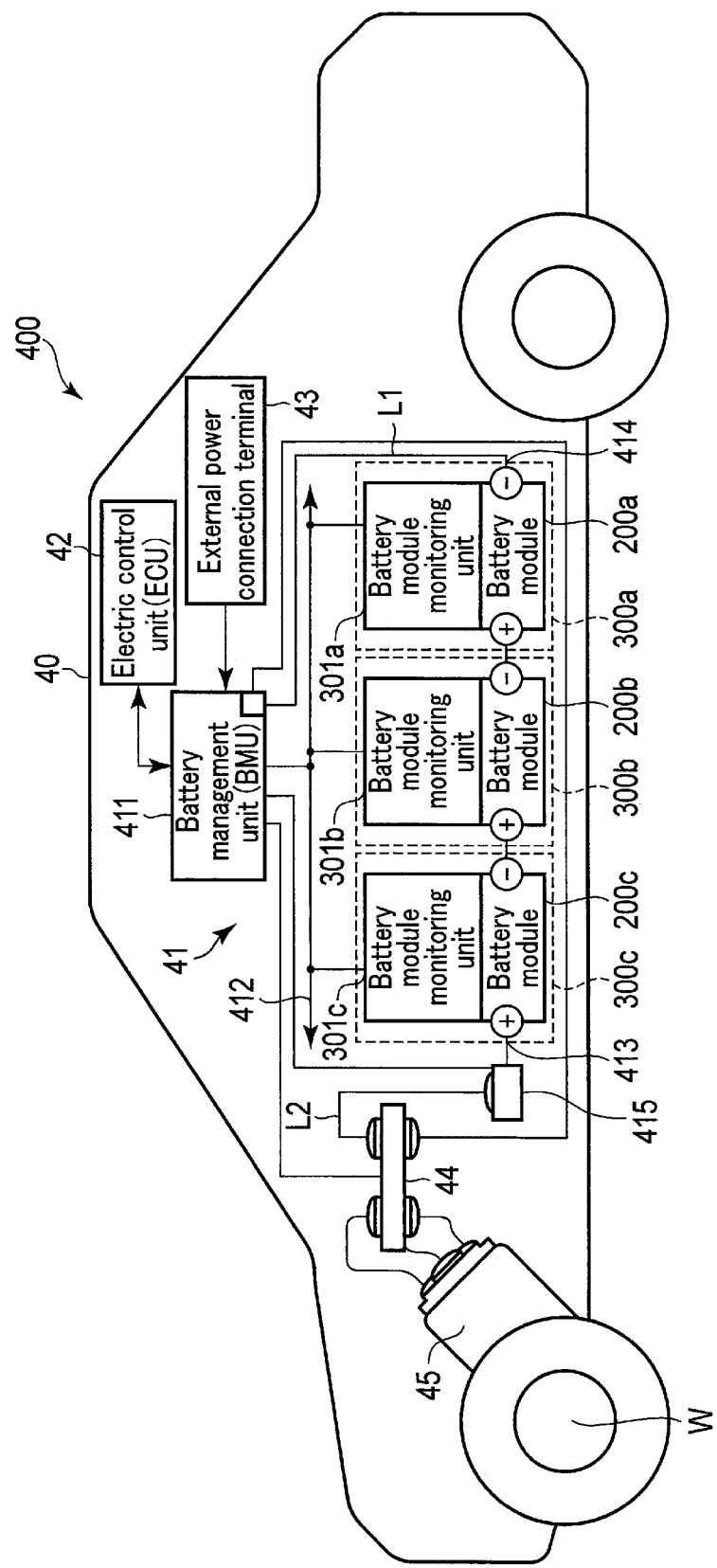
F I G. 12

SECONDARY BATTERY, BATTERY PACK, AND VEHICLE

CROSS-REFERENCE TO RELATED APPLICATIONS

This application is based upon and claims the benefit of priority from the Japanese Patent Applications No. 2018-50665, filed Mar. 19, 2018, and No. 2018-162815, filed Aug. 31, 2018, the entire contents of all of which are incorporated herein by reference.

FIELD

Embodiments described herein relate generally to a secondary battery, a battery pack and a vehicle.

BACKGROUND

A secondary battery charged and discharged by diffusion of lithium ions in a negative electrode and a positive electrode has been actively researched and developed as a high energy density battery.

Currently, nonaqueous electrolyte batteries including a lithium-transition metal composite oxide as a positive electrode active material and a carbonaceous material or a titanium composite oxide as a negative electrode active material have been commercialized. Examples of transition metals in the lithium-transition metal composite oxide include Co, Mn, and Ni.

On the other hand, it is known that when the secondary battery is used repeatedly, the positive electrode active material or the negative electrode active material deteriorates, and deterioration such as reduction in capacity of the secondary battery progresses. One of causes of the deterioration is, for example, a reaction between an active material and an electrolytic solution. As a method for suppressing this reaction, for example, there is a technique for forming a film on a surface of the active material, preventing decomposition of the electrolytic solution by the film, and suppressing deterioration of battery characteristics.

BRIEF DESCRIPTION OF THE DRAWINGS

FIG. 8 is a perspective view schematically showing an example of a battery module according to the embodiment;

FIG. 10 is a block diagram showing an example of an electric circuit of the battery pack shown in FIG. 9;

FIG. 11 is a cross-sectional view schematically showing an example of a vehicle according to the embodiment;

FIG. 12 is a view schematically showing another example of the vehicle according to the embodiment.

DETAILED DESCRIPTION

Figure 1:
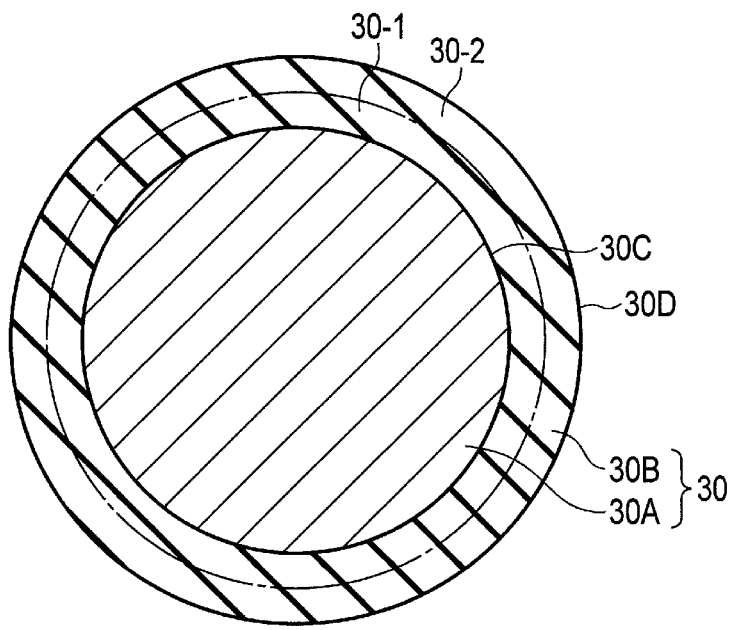
FIG. 1 is a schematic cross-sectional view of an active material composite included in a negative electrode included in a secondary battery according to an embodiment.

According to one embodiment, a secondary battery is provided. The secondary battery includes a positive electrode, a negative electrode, and a nonaqueous electrolyte. The negative electrode includes an active material composite. The active material composite includes active material particles and a layer covering at least a portion of surfaces of the active material particles. The active material particles include titanium-containing oxide particles. The layer contains N and Si. The layer includes a first surface facing the at least the portion of the surfaces of the active material particles and a second surface defining a layer thickness from the first surface. An N concentration in the layer decreases from the first surface to the second surface. A Si concentration in the layer increases from the first surface to the second surface. The nonaqueous electrolyte contains a silyl group-containing compound containing a trialkylsilyl group and/or a trialkoxysilyl group. The nonaqueous electrolyte satisfies the following formula (1): $0 \leq B/A \leq 0.5$; (2): $0 \text{ wt\%} < A \leq 2.0 \text{ wt\%}$; and (3): $0 \text{ wt\%} \leq B \leq 0.25 \text{ wt\%}$. Here, A is a concentration [wt %] of the silyl group-containing compound in the nonaqueous electrolyte. B is a concentration [wt %] of a diisocyanate compound in the nonaqueous electrolyte.

The embodiment provides a battery module including the secondary batteries according to the embodiment.

The embodiment provides a battery pack including the secondary battery according to the embodiment.

The embodiment provides a vehicle including the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to the first embodiment, a secondary battery is provided. The secondary battery includes a positive electrode, a negative electrode, and a nonaqueous electrolyte. The negative electrode includes an active material composite. The active material composite includes active material particles and a layer or layers covering at least a portion of surfaces of the active material particles. The active material particles include titanium-containing oxide particles. The layer contains N and Si. The layer includes a first surface facing the at least the portion of the surfaces of the active material particles and a second surface defining a layer thickness from the first surface. An N concentration in the layer decreases from the first surface to the second surface. A Si concentration in the layer increases from the first surface to the second surface. The nonaqueous electrolyte contains a silyl group-containing compound containing a trialkylsilyl group and/or a trialkoxysilyl group. The nonaqueous electrolyte satisfies the following formula (1): $0 \leq B/A \leq 0.5$; (2): $0 \text{ wt \%} < A \leq 2.0 \text{ wt \%}$; and (3): $0 \text{ wt \%} \leq B \leq 0.25 \text{ wt \%}$. Here, A is a concentration [wt %] of the silyl group-containing compound in the nonaqueous electrolyte. B is a concentration [wt %] of a diisocyanate compound in the nonaqueous electrolyte. The nonaqueous electrolyte may or may not contain the diisocyanate compound.

For example, formation of a protective film on the surface of the negative electrode can suppress the reaction between the electrolytic solution and the negative electrode and can in turn improve the battery life. However, in a secondary battery including a negative electrode containing a carbon-based material as a negative electrode active material, a high resistance film is formed on the surface of the negative electrode, and therefore, battery characteristics are deteriorated.

On the other hand, in a secondary battery including a negative electrode containing an oxide-based material as a negative electrode active material, it is not limited thereto, and a film is preferably formed. However, even in the secondary battery including the negative electrode containing the oxide-based material as the negative electrode active material, there may occur a problem that resistance of the negative electrode becomes large depending on the thickness and structure of the film, and the input-output characteristics may be remarkably deteriorated, particularly at low temperature. For example, a film is formed on the negative electrode by adding a diisocyanate compound to the electrolytic solution, so that the charge-and-discharge cycle at high temperature can be improved. However, as a result of intensive research, the inventors have found that such a means deteriorates cycle charge-and-discharge characteristics at low temperature. On the other hand, a film can be formed both on the surface of the positive electrode and on the surface of the negative electrode by adding a trialkylsilyl group-containing compound to the electrolytic solution, and the charge-and-discharge cycle characteristics can be in turn improved. However, as a result of intensive research, the present inventors have found that the film forming ability by this means is weaker than that of means using a diisocyanate compound, and the effect is small with single use.

As a result of further research based on the above findings, the present inventors have found a secondary battery according to the first embodiment.

The negative electrode of the secondary battery according to the first embodiment includes an active material composite. The active material composite includes an active material composite including active material particles including titanium-containing oxide particles and a layer covering at least a portion of the surface of the active material particles. The layer contains N and Si. The layer includes a first surface facing the surface of the active material particles and a second surface defining a layer thickness from the first surface. An N concentration in the layer decreases from the first surface to the second surface. A Si concentration in the layer increases from the first surface to the second surface.

Such a layer can exhibit low resistance to diffusion of Li ions through the second surface of the layer. Thus, the negative electrode of the secondary battery according to the first embodiment can exhibit low resistance even in a low temperature environment. In addition, this layer can more sufficiently suppress the reaction between the surface of the titanium-containing oxide particles and the nonaqueous electrolyte even in a high temperature environment, for example. Moreover, the layer can exhibit a high Si concentration on the second surface. Such a layer having the second surface can trap water molecule that may be present in the secondary battery. Examples of water molecule that may be present in the secondary battery include moisture contained as an impurity in the material of the secondary battery and water molecule that may be generated as the secondary battery is charged and discharged. The water molecule that may be generated as the secondary battery is charged and discharged is, for example, due to decomposition of the nonaqueous electrolyte or decomposition of impurities. The water molecule that may be present in the secondary battery undergoes electrolysis during charging or discharging of the secondary battery and can generate gas. In the secondary battery according to the first embodiment, since the layer of the active material composite can trap water molecule that causes gas generation, gas generation can be suppressed, so that excellent life characteristics can be exhibited.

In the secondary battery according to the first embodiment including the negative electrode which includes the titanium-containing oxide particles and the layer having the N concentration and the Si concentration as described above, and the nonaqueous electrolyte containing a silyl group-containing compound and satisfying the above (1) to (3), it is possible to prevent an excessive additional layer from being formed on the layer of the active material composite even when the secondary battery is repeatedly subjected to charging and discharging. Thus, the secondary battery according to the first embodiment can prevent the resistance of the negative electrode from increasing, for example, even when the secondary battery is repeatedly subjected to the charge-and-discharge cycle. In addition, the silyl group-containing compound contained in the nonaqueous electrolyte reacts with moisture that may be present in the secondary battery and thereby can also trap the moisture. The reaction between the silyl group-containing compound and moisture can reinforce a portion where the thickness of the layer of the active material composite is small during charging or discharging of the secondary battery, for example. Alternatively, in the reaction between the silyl group-containing compound and moisture, when a portion of the surface of the active material particles is exposed due to cracking of the active material composite during charging or discharging of the secondary battery, a Si-containing layer can be formed on the portion of the surface of the active material particles.

As a result, the secondary battery according to the first embodiment can exhibit excellent life characteristics at low temperature and excellent life characteristics at high temperature.

A secondary battery in which the active material composite includes a layer in which the N concentration is uniform may include, for example, a secondary battery in which the N concentration on the second surface of the layer is too high. In this secondary battery, resistance to diffusion of Li ions through the second surface of the layer of the active material composite is too high. Thus, the negative electrode of the secondary battery exhibits a high resistance value particularly in a low temperature environment. When such a secondary battery is repeatedly subjected to the charge-and-discharge cycle in a low temperature environment, the negative electrode is subjected to a heavy load, and degradation progresses. Thus, such a secondary battery cannot exhibit better cycle life characteristics than the secondary battery according to the first embodiment in a low temperature environment.

Alternatively, the secondary battery in which the active material composite includes the layer in which the N concentration is uniform may include, for example, a secondary battery in which the N concentration on the first surface of the layer is too low. This secondary battery cannot suppress the reaction between the active material particles and the nonaqueous electrolyte as compared with the secondary battery according to the first embodiment.

A secondary battery in which the active material composite includes a layer in which the Si concentration is uniform may include, for example, a secondary battery in which the Si concentration on the second surface of the layer is too low. In such a secondary battery, the second surface of the layer cannot sufficiently trap moisture that may be present in the secondary battery. Thus, this secondary battery cannot suppress gas generation derived from moisture as compared with the secondary battery according to the first embodiment.

Alternatively, the secondary battery in which the active material composite includes the layer in which the Si concentration is uniform may include, for example, a secondary battery in which the Si concentration on the first surface of the layer is too high. This secondary battery cannot sufficiently suppress the reaction between the active material particles and the nonaqueous electrolyte.

In the secondary battery in which the active material particles of the negative electrode contains no titanium-containing oxide particles, for example, the secondary battery in which the negative electrode contains a carbon-based material as the negative electrode active material, as described above, if a layer is formed on the negative electrode active material, the layer has a high resistance.

In the secondary battery in which a concentration ratio B/A in the nonaqueous electrolyte exceeds 0.5, the N concentration on the first surface becomes too high, and the resistance of the negative electrode increases, resulting in deterioration of the negative electrode. In the secondary battery in which a concentration A in the nonaqueous electrolyte exceeds 2.0% by weight and the secondary battery in which a concentration B in the nonaqueous electrolyte exceeds 0.25% by weight, when these secondary batteries are repeatedly subjected to the charge-and-discharge cycle, an excessive layer is further formed on the surface of the active material composite. Thus, in these secondary batteries, the resistance of the negative electrode increases as the secondary battery is repeatedly subjected to the charge-and-discharge cycle, resulting in deterioration of the negative electrode.

On the other hand, in a secondary battery in which the nonaqueous electrolyte does not contain a silyl group-containing compound containing a trialkylsilyl group and/or a trialkoxysilyl group, the reaction between the silyl group-containing compound and moisture in the secondary battery cannot be used. Thus, the secondary battery in which the nonaqueous electrolyte does not contain the silyl-group containing compound cannot exhibit better life characteristics than the secondary battery according to the first embodiment.

The layer of the active material composite can exhibit, for example, an N concentration gradient decreasing from the first surface to the second surface and a Si concentration gradient increasing from the first surface to the second surface. In addition, the layer of the active material composite may cover a portion of the surface of the active material particles, or may cover the entire surface of the active material particles. In a preferred embodiment, the layer of the active material composite covers the entire surface of the active material particles.

Next, an active material composite included in the negative electrode of the secondary battery in an example according to the first embodiment will be described with reference to the drawings.

Figure 2:
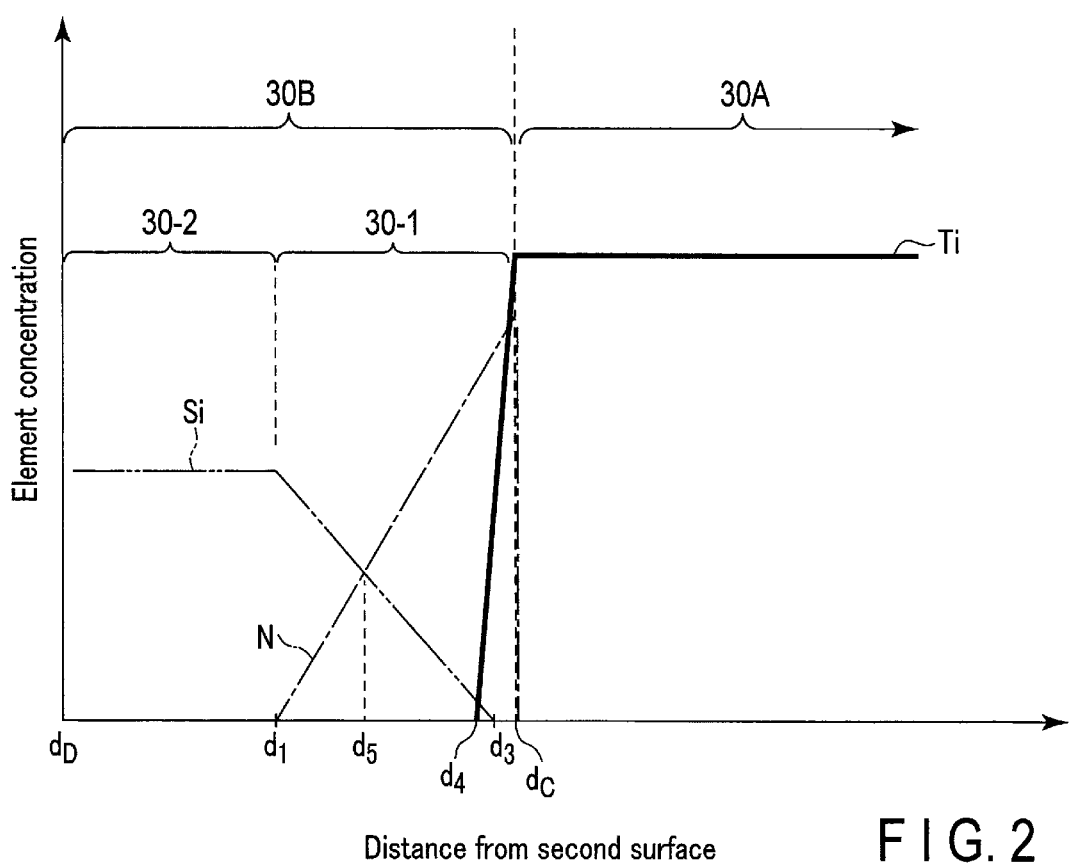
FIG. 2 is a view schematically showing concentration distributions of N, Si, and Ti in a layer of the active material composite shown in FIG. 1.

FIG. 1 is a schematic cross-sectional view of the active material composite included in the negative electrode included in an example of the secondary battery according to the first embodiment. FIG. 2 is a view schematically showing concentration distributions of N, Si, and Ti in a layer of the active material composite shown in FIG. 1.

The active material composite 30 shown schematically in cross section in FIG. 1 includes an active material particle 30A and a layer 30B formed on the surface of the active material particle 30A. In the active material composite 30 of the example shown in FIG. 1, the entire surface of the active material particle 30A is covered with the layer 30B. In FIG. 1, the thickness of the layer 30B is exaggerated so that the presence of the layer 30B can be easily understood. The actual thickness of the layer 30B may be very small with respect to the size of the active material particle 30A.

The layer 30B includes a first surface 30C facing the surface of the active material particle 30A and a second surface 30D defining a layer thickness from the first surface 30C.

FIG. 2 shows changes in concentrations of N, Si and Ti in the active material composite 30 that accompany changes in distance from the second surface 30D. In FIG. 2, the change in N concentration is indicated by a one-dot chain line. The change in Si concentration is indicated by a two-dot chain line. The change in Ti concentration is indicated by a solid line. The distance from the second surface in FIG. 2 is the distance in a direction from the second surface 30D to the first surface 30C of the layer 30B schematically shown in FIG. 1. In FIG. 2, the position indicated by the symbol $d_D$ on the horizontal axis corresponds to the position of the second surface 30D shown in FIG. 1. In addition, the position indicated by the symbol $d_C$ on the horizontal axis corresponds to the position of the first surface 30C shown in FIG. 1.

As is apparent from FIG. 2, the layer 30B contains N and Si. As schematically shown in FIG. 2, the N concentration in the layer 30B increases as the distance from the second surface 30D (position $d_D$) increases. On the other hand, as schematically shown in FIG. 2, the Si concentration in the layer 30B decreases as the distance from the second surface 30D (position $d_D$) increases. In other words, the N concentration in the layer 30B of the active material composite 30 shown in FIG. 1 decreases from the first surface 30C (position $d_C$) to the second surface 30D (position $d_D$). On the other hand, the Si concentration in the layer 30B of the active material composite 30 shown in FIG. 1 increases from the first surface 30C (position $d_C$) to the second surface 30D (position $d_D$). In other words, the layer 30B of the active material composite 30 shown in FIG. 1 exhibits an N concentration gradient decreasing from the first surface 30C (position $d_C$) to the second surface 30D (position $d_D$) and a Si concentration gradient increasing from the first surface 30C (position $d_C$) to the second surface 30D (position $d_D$).

As seen from FIG. 2, a portion from the second surface 30D (position $d_D$) to a position $d_1$ has a substantially constant Si concentration and does not contain N and Ti. The portion from the second surface 30D (position $d_D$) to the position $d_1$ corresponds to a second portion 30-2 of the layer 30B shown in FIG. 1. In a portion from the position $d_1$ to the first surface 30C (position $d_C$), the N concentration increases with approaching the first surface 30C (position $d_C$). On the other hand, in a portion from the position $d_1$ to a position $d_3$, the Si concentration decreases with approaching the first surface 30C (position $d_C$). It should be noted that the distance between the position $d_3$ and the second surface 30D (position $d_D$) is smaller than the distance between the first surface 30C (position $d_C$) and the second surface 30D (position $d_D$). In a portion from a position $d_4$ between the position $d_1$ and the position $d_3$ to the first surface 30C (position $d_C$), the Ti concentration increases with approaching the first surface 30C (position $d_C$). The portion from the position $d_1$ to the first surface 30C (position $d_C$) corresponds to a first portion 30-1 of the layer 30B shown in FIG. 1. As is apparent from FIG. 2, the N concentration is higher than the Si concentration in a portion from a position $d_5$ located between the position $d_1$ and the position $d_4$ to the first surface 30C (position $d_C$).

As is apparent from FIG. 2, the first portion 30-1 of the layer 30B contains Ti at a portion close to the first surface 30C (position $d_C$) of the layer 30B. The portion further away from the second surface 30D (position $d_D$) than the first surface 30C (position $d_C$) contains neither N nor Si and has a constant Ti concentration. That is, a portion whose distance from the second surface 30D (position $d_D$) is larger than the layer thickness defined by the first surface 30C (position $d_C$) and the second surface 30D (position $d_D$) is the active material particle 30A.

In FIG. 1, a boundary between the first portion 30-1 and the second portion 30-2 of the layer 30B is schematically shown by using a one-dot chain line. However, it should be noted that there is no clear boundary between the first portion 30-1 and the second portion 30-2 in the actual layer 30B.

The active material particles contained in the active material composite are not limited to primary particles as shown in FIG. 1. For example, the active material particles may be secondary particles which is an aggregation of titanium-containing oxide particles. In this case, the layer of the active material composite covers at least a portion of the surface of the active material particles which are secondary particles. The layer may be further formed between the primary particles inside the secondary particles.

In FIG. 1, although the active material particles and the titanium-containing oxide particles are shown in a shape close to a sphere, the shapes of the active material particles and the titanium-containing oxide particles are not limited to the shape close to a sphere, and these particles may be shapeless, or may have a flat shape or a fiber shape.

Next, the secondary battery according to the first embodiment will be described in more detail.

The secondary battery according to the first embodiment includes a positive electrode, a negative electrode, and a nonaqueous electrolyte.

The positive electrode can include, for example, a positive electrode current collector and a positive electrode active material-containing layer. The positive electrode active material-containing layer may be formed on both surfaces or one surface of the positive electrode current collector. The positive electrode active material-containing layer can contain a positive electrode active material, and optionally a conductive agent and a binder. The positive electrode current collector may include a portion where a positive electrode active material-containing layer is not formed on a surface of the positive electrode current collector. This portion may serve as a positive electrode tab.

The negative electrode can include, for example, a negative electrode current collector and a negative electrode active material-containing layer. The negative electrode active material-containing layer may be formed on both surfaces or one surface of the negative electrode current collector. The negative electrode current collector may include a portion where a negative electrode active material-containing layer is not formed on a surface of the negative electrode current collector. This portion can serve as a negative electrode tab.

The negative electrode includes an active material composite. The active material composite may be, for example, contained as a negative electrode active material in the negative electrode active material-containing layer. The negative electrode active material-containing layer may optionally further contain a conductive agent and a binder.

The secondary battery according to the first embodiment may further include a separator disposed between the positive electrode and the negative electrode. The negative electrode, the positive electrode, and the separator can constitute an electrode group. The nonaqueous electrolyte may be held in the electrode group.

The secondary battery according to the first embodiment may further include a container member for storing the electrode group and an electrolyte.

The secondary battery according to the first embodiment may furthermore include a negative electrode terminal electrically connected to the negative electrode and a positive electrode terminal electrically connected to the positive electrode.

Hereinafter, the container member, the negative electrode, the positive electrode, the separator, the nonaqueous electrolyte, the negative electrode terminal, and the positive electrode terminal will be described in detail.

(1) Container Member

As a container member, a container formed from a laminate film or metallic container may be used, for example.

The thickness of the laminate film is, for example, not more than 0.5 mm, preferably not more than 0.2 mm.

As the laminate film, a multilayer film including resin layers and a metal layer interposed between the resin layers is used. The resin layer contains, for example, a polymer material such as polypropylene (PP), polyethylene (PE), nylon, and polyethylene terephthalate (PET). The metal layer is preferably formed of an aluminum foil or an aluminum alloy foil for attaining weight saving. The laminate film is sealed by thermal fusion bonding and thereby can be formed into the shape of the container member.

The thickness of a wall of the metallic container is, for example, not more than 1 mm, more preferably not more than 0.5 mm, and still more preferably not more than 0.2 mm.

The metallic container is formed from aluminum, aluminum alloy, or the like, for example. The aluminum alloy preferably contains elements such as magnesium, zinc, and silicon. When the aluminum alloy contains transition metals such as iron, copper, nickel, and chromium, the content of the transition metals is preferably not more than 100 ppm by weight.

The shape of the container member is not particularly limited. The shape of the container member can be selected from, for example, a flat type (thin type), a rectangular type, a cylindrical type, a coin type, and a button type. The container member can be appropriately selected depending on the size of the battery and the use of the battery.

(2) Negative Electrode

The titanium-containing oxide particles contained in the negative electrode may contain, for example, at least one titanium-containing oxide selected from the group consisting of spinel type lithium-titanium composite oxide, monoclinic p-type titanium-containing oxide, the monoclinic niobium titanium composite oxide, orthorhombic titanium-containing composite oxide, ramsdellite type lithium-titanium composite oxide, hollandite type lithium-titanium composite oxide, anatase type titanium-containing oxide, and rutile type titanium-containing oxide. These titanium-containing oxides can exhibit Li ions insertion/extraction potential (operating potential) of not less than 0.5V (vs. Li/Li$^+$). In addition, the titanium-containing oxide particles may contain a mixture of plural kinds of particles among the above-mentioned titanium-containing oxides. For example, it is possible to use a mixture of spinel type lithium-titanium composite oxide particles and monoclinic β-type titanium-containing oxide particles, or a mixture of spinel type lithium-titanium composite oxide particles and monoclinic niobium titanium composite oxide particles.

The spinel type lithium-titanium composite oxide is, for example, lithium titanate (for example, $Li_{4+x}Ti_5O_{12}$, $0 \leq x \leq 3$) having a spinel structure. The ramsdellite type lithium-titanium composite oxide is, for example, lithium titanate (for example, $Li_{2+y}Ti_3O_7$, $0 \leq y \leq 3$) having a ramsdellite structure. An example of a hollandite type lithium-titanium composite oxide is a compound represented by a general formula $A_xTi_{8-y}B_yO_{16}$. In this general formula, A is at least one element selected from the group consisting of alkali metal elements, alkaline earth metals, Ag and Tl. B is at least one element having a relatively high Pauling electronegativity and an ionic radius suitable for facilitating the formation of a hollandite structure. Specifically, B is at least one element selected from the group consisting of Al, V, Cr, Mn, Fe, Co, Ni, Cu, Zn, Ga, Y, Zr, Nb, Mo, Sn, Hf, Ta, W, Bi and lanthanoid elements. $0.5<x\leq2$, $0\leq y\leq 3$ is satisfied in a combination of cations of A and B, respectively.

Examples of the monoclinic niobium titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0\leq x\leq 5$, $0\leq y<1$, $0\leq z<2$, and $-0.3\leq\delta\leq 0.3$. Specific examples of the monoclinic niobium titanium composite oxide include $Li_xNb_2TiO_7$ ($0\leq x\leq 5$).

Another example of the monoclinic niobium titanium composite oxide is a compound represented by $Ti_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: $0\leq y<1$, $0\leq z\leq 2$, and $-0.3\leq\delta\leq 0.3$.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni, and Al. The respective subscripts in the composition formula are specified as follows: $0\leq a\leq 6$, $0\leq b<2$, $0\leq c<6$, $0\leq d<6$, and $-0.5\leq\sigma\leq 0.5$. Specific examples of the orthorhombic titanium-containing composite oxide include $Li_{2+a}Na_2Ti_6O_{14}$ ($0\leq a\leq 6$).

The monoclinic β-type titanium-containing oxide, the anatase type titanium-containing oxide and the rutile type titanium-containing oxide can have, for example, a composition of $TiO_2$. Alternatively, these titanium-containing oxides may contain metal elements other than Ti. The monoclinic β-type titanium-containing oxide can also be expressed as $TiO_2$ (B).

The shape of the titanium-containing oxide particle is not particularly limited. The active material particles may contain primary particles of titanium-containing oxide particles, secondary particles formed by aggregation of primary particles of titanium-containing oxide particles, or a mixture of the primary particles of the titanium-containing oxide particles and the secondary particles.

The average primary particle size of the titanium-containing oxide particles is not particularly limited, but is preferably not less than 0.05 μm and not more than 2 μm, and more preferably not less than 0.2 μm and not more than 1 μm. The average secondary particle size of the titanium-containing oxide particles is not particularly limited, but is preferably not less than 1 μm and not more than 20 μm, and more preferably not less than 3 μm and not more than 10 μm.

The specific surface area of the active material particles is preferably not less than 1 m$^2$/g and not more than 20 m$^2$/g, and more preferably not less than 2 m$^2$/g and not more than 10 m$^2$/g.

In measuring the specific surface area of the active material particles, there is employed a method in which a molecule of which the adsorption occupying area is known is made to adsorb to a surface of a powder particle at the temperature of liquid nitrogen, and the specific surface area is calculated from the amount of the molecule adsorbed on it. The most commonly used is the BET method using low temperature and low humidity physical adsorption of inert gas, and the BET method is based on the well-known theory for the calculating specific surface area. The theory is obtained by extending the Langmuir theory which is monolayer adsorption theory to multilayer adsorption. The specific surface area obtained by the BET method is referred to as the BET specific surface area.

The layer covering at least a portion of the surface of the active material contains N and Si as described above. The layer can have, for example, an average thickness of not more than 5 nm. The average thickness of the layer is preferably not less than 0.5 nm and not more than 3 nm. The layer having the preferable average thickness can further prevent the reaction between the active material particles and the nonaqueous electrolyte while suppressing an increase in the resistance of the negative electrode in a low temperature environment.

The average thickness of a portion in the layer where the N concentration is higher than the Si concentration is preferably not less than 0.05 nm and not more than 1 nm, and more preferably not less than 0.2 nm and not more than 0.7 nm.

The active material composite may further include a carbon-containing layer interposed at least a portion between the active material particles and the layer. The carbon-containing layer can cover at least a portion of the surface of the active material particles. That is, the carbon-containing layer can cover a portion of the surface of the active material particles or can cover the entire surface of the active material particles. When the carbon-containing layer covers a portion of the active material particle, the layer containing N and Si can be in contact with and cover a portion of the surface of the active material particles. Further, when the carbon-containing layer covers a portion of the active material particle, the layer containing N and Si can cover at least a portion of the surface of the carbon-containing layer. When the carbon-containing layer covers the entire surface of the active material particles, the layer containing N and Si can be in contact with and cover at least a portion of the surface of the carbon-containing layer. The carbon-containing layer can have, for example, an average thickness of 1 to 10 nm.

On the other hand, when the active material composite does not include the carbon-containing layer, the first surface of the layer containing N and Si may be in contact with at least a portion of the surface of the active material particles.

Here, an example of an active material composite in which the active material particles include the carbon-containing layer will be described below with reference to the drawings.

Figure 3:
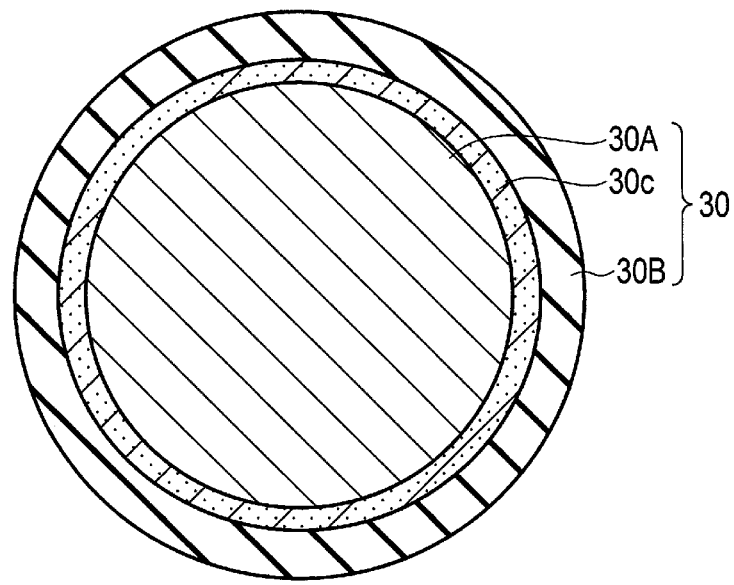
FIG. 3 is a schematic cross-sectional view of an active material composite as an example, which may be included in the secondary battery according to the embodiment.

FIG. 3 is a schematic cross-sectional view of an active material composite as an example, which may be included in the secondary battery according to the first embodiment.

The active material composite 30 shown in FIG. 3 includes the active material particle 30A. The active material composite 30 further includes a carbon-containing layer 30c covering the surface of the active material particle 30A. The active material composite 30 further includes the layer 30B covering the surface of the carbon-containing layer 30c. That is, the active material composite 30 shown in FIG. 3 includes the carbon-containing layer 30c interposed between the active material particle 30A and the layer 30B. In FIG. 3, the thickness of the layer 30B and the thickness of the carbon-containing layer 30c are exaggerated so that the presence of the layer 30B and the carbon-containing layer 30c can be easily understood. The actual thickness of each of the layer 30B and the carbon-containing layer 30c may be very small with respect to the size of the active material particle 30A.

A conductive agent is added in order to increase the current-collecting performance of active material particles and to suppress the contact resistance with the negative electrode current collector. Examples of the conductive agent include acetylene black, carbon black, graphite, carbon fiber, graphene, carbon nanofiber, and fullerene.

The binder can bind the active material particles and the conductive agent. Examples of the binder include polytetrafluoroethylene (PTFE), polyvinylidene fluoride (PVdF), fluorine rubber, polyacrylonitrile, polyethylene oxide, sodium carboxymethyl cellulose, poly alginic acid, and styrene butadiene rubber.

A mixing ratio of the active material composite, the conductive agent and the binder in the negative electrode active material-containing layer can be appropriately changed according to the application of the electrode. In the negative electrode active material-containing layer, the active material composite, the conductive agent, and the binder are preferably contained in an amount of not less than 70% by weight and not more than 96% by weight, not less than 2% by weight and not more than 28%, and not less than 2% by weight and not more than 28% by weight, respectively. When the content of the conductive agent is not less than 2% by weight, it is possible to improve the current-collecting performance of the negative electrode active material-containing layer and the large current characteristics of the secondary battery. In addition, when the content of the binder is not less than 2% by weight, it is possible to improve the binding property between the negative electrode active material-containing layer and the current collector and to enhance the cycle performance. On the other hand, in order to make the capacity higher, it is preferable that the contents of the conductive agent and the binder are respectively not more than 28% by weight.

The negative electrode current collector is formed of a material which is electrochemically stable at a potential where lithium (Li) ions are inserted into and extracted from the titanium-containing oxide particles. For example, the negative electrode current collector is preferably formed of copper, nickel, stainless steel or aluminum, or aluminum alloy containing one or more elements selected from the group consisting of Mg, Ti, Zn, Mn, Fe, Cu, and Si. The thickness of the current collector is preferably not less than 5 µm and not more than 20 µm. The current collector having such a thickness can keep the balance between the strength of the electrode and light-weight performance.

The density of the negative electrode active material-containing layer (not including the current collector) is preferably not less than 1.8 g/cm$^3$ and not more than 3.0 g/cm$^3$. The negative electrode, in which the density of the negative electrode active material-containing layer is within this range, is excellent in terms of energy density and holding property of the electrolyte. The density of the negative electrode active material-containing layer is more preferably not less than 2.1 g/cm$^3$ and not more than 2.8 g/cm$^3$.

(3) Positive Electrode

As the positive electrode active material, an oxide or a sulfide can be used for example. The positive electrode may contain only one kind of compound as a positive electrode active material, or may contain a combination of two or more kinds of compounds. Examples of oxides and sulfides include compounds capable of allowing lithium or lithium ions to be inserted in and extracted from the compounds.

Examples of such compounds include manganese dioxide ($MnO_2$), iron oxide, copper oxide, nickel oxide, lithium manganese composite oxide (for example, $Li_xMn_2O_4$ or $Li_xMnO_2$; $0<x\leq1$), lithium nickel composite oxide (for example, $Li_xNiO_2$; $0<x\leq1$), lithium cobalt composite oxide (for example, $Li_xCoO_2$; $0<x\leq1$), lithium nickel cobalt composite oxide (for example, $Li_xNi_{1-y}Co_yO_2$; $0<x\leq1$, $0<y<1$), lithium manganese cobalt composite oxide (for example, $Li_xMn_yCo_{1-y}O_2$; $0<x\leq1$, $0<y<1$), lithium manganese nickel composite oxide having a spinel structure (for example, $Li_xMn_{2-y}Ni_yO_4$; $0<x\leq1$, $0<y<2$), lithium phosphorus oxide having an olivine structure (for example, $Li_xFePO_4$; $0<x\leq1$; $Li_xFe_{1-y}Mn_yPO_4$; $0<x\leq1$, $0<y<1$, $Li_xCoPO_4$; $0<x\leq1$), iron sulfate ($Fe_2(SO_4)_3$), vanadium oxide (for example, $V_2O_5$), and lithium nickel cobalt manganese composite oxide ($Li_xNi_{1-y-z}Co_yMn_zO_2$; $0<x\leq1$, $0<y<1$, $0<z<1$, $y+z<1$).

Among them, examples of more preferable compounds as the positive electrode active material include lithium manganese composite oxide having a spinel structure (for example, $Li_xMn_2O_4$; $0<x\leq1$), lithium nickel composite oxide (for example, $Li_xNiO_2$; $0<x\leq1$), lithium cobalt composite oxide (for example, $Li_xCoO_2$; $0<x\leq1$), lithium nickel cobalt composite oxide (for example, $Li_xNi_{1-y}Co_yO_2$; $0<x\leq1$, $0<y<1$), lithium manganese nickel composite oxide having a spinel structure (for example, $Li_xMn_{2-y}Ni_yO_4$; $0<x\leq1$, $0<y<2$), lithium manganese cobalt composite oxide (for example, $Li_xMn_yCo_{1-y}O_2$; $0<x\leq1$, $0<y<1$), lithium iron phosphate (for example, $Li_xFePO_4$; $0<x\leq1$), and lithium nickel cobalt manganese composite oxide ($Li_xNi_{1-y-z}Co_yMn_zO_2$; $0<x\leq1$, $0<y<1$, $0<z<1$, $y+z<1$). When at least one of these compounds is used as the positive electrode active material, a positive electrode potential can be increased.

In one preferred embodiment, the positive electrode active material includes a composite oxide represented by the general formula $Li_xMO_2$. In the above general formula, M includes at least one selected from the group consisting of Ni, Co and Mn. That is, M may be any one of Ni, Co and Mn, may be any one of the combinations of Ni and Co, Co and Mn, and Ni and Mn, or may be a combination of Ni, Co and Mn. The positive electrode active material can include, for example, $Li_xCoO_2$, $LiNiO_2$, $Li_2Mn_2O_4$, or $Li_xNi_a$-$Co_bMn_cO_2$ (a+b+c=1). In the above general formulas and composition formulas, x can take a numerical value of 0<x≤1. Other preferred positive electrode active materials include, for example, $Li_xFePO_4$ and $Li_xMnPO_4$. In the above composition formulas, x can take a numerical value of 0<x≤1.

A primary particle size of the positive electrode active material is preferably not less than 100 nm and not more than 1 µm. The positive electrode active material having a primary particle size of not less than 100 nm is easy to handle during industrial production. In the positive electrode active material having a primary particle size of not more than 1 µm, diffusion of lithium ions within solid can proceed smoothly.

The specific surface area of the positive electrode active material is preferably not less than 0.1 $m^2$/g and not more than 10 $m^2$/g. The positive electrode active material having a specific surface area of not less than 0.1 $m^2$/g can secure sufficient sites for inserting and extracting lithium ions. The positive electrode active material having a specific surface area of not more than 10 $m^2$/g is easy to handle during industrial production, and can secure a good charge-and-discharge cycle performance. The specific surface area of the positive electrode active material can be measured by the BET method described above.

A conductive agent is added in order to increase the current-collecting performance of the positive electrode active material and to suppress the contact resistance with the positive electrode current collector. Examples of the conductive agent include acetylene black, carbon black, graphite, carbon fiber, graphene, carbon nanofiber, and fullerene.

The binder is added to bind the positive electrode active material and the conductive agent. Examples of the binder include polytetrafluoroethylene (PTFE), polyvinylidene fluoride (PVdF), fluorocarbon rubber, polyacrylonitrile, and polyethylene oxide.

In the positive electrode active material-containing layer, the active material, the conductive agent, and the binder are preferably contained in an amount of not less than 80% by weight and not more than 95% by weight, not less than 3% by weight and not more than 18% by weight, and not less than 2% by weight and not more than 17% by weight, respectively. When the content of the conductive agent is not less than 3% by weight, the above-described effect can be exhibited. When the content of the conductive agent is not more than 18% by weight, decomposition of the nonaqueous electrolyte on the surface of the conductive agent under high temperature storage can be reduced. When the content of the binder is not less than 2% by weight, sufficient positive electrode strength can be obtained. When the content of the binder is not more than 17% by weight, the blending amount of the binder which is an insulating material in the positive electrode can be decreased, and the internal resistance can be reduced.

The positive electrode current collector is preferably, for example, an aluminum foil or an aluminum alloy foil containing elements such as Mg, Ti, Zn, Mn, Fe, Cu and Si.

The positive electrode can be produced as described below, for example. First, the above-described positive electrode active material, conductive agent, and binder are provided. Then, they are suspended in an appropriate solvent, and this suspension is applied onto both surfaces or one surface of a current collector such as an aluminum foil and dried. The positive electrode is obtained by pressing the current collector after drying the suspension. The obtained positive electrode is, for example, a band-like electrode. The positive electrode may also be produced by forming a positive electrode active material, a conductive agent, and a binder into a pellet shape to obtain the positive electrode active material-containing layer, and forming the positive electrode active material-containing layer on the current collector.

(4) Separator

The separator is formed of a porous film containing a material such as polyethylene (PE), polypropylene (PP), cellulose, or polyvinylidene fluoride (PVdF), or a nonwoven fabric of a synthetic resin. From the viewpoint of safety, it is preferable to use a porous film formed of polyethylene or polypropylene. This is because these porous films melt at a constant temperature and can block electric current.

(5) Nonaqueous Electrolyte

As the nonaqueous electrolyte, a liquid nonaqueous electrolyte or gel-like nonaqueous electrolyte can be used, for example.

The liquid nonaqueous electrolyte can be prepared by dissolving an electrolyte in an organic solvent. The liquid nonaqueous electrolyte is preferably prepared by dissolving an electrolyte in an organic solvent at a concentration of not less than 0.5 M and not more than 2.5 M.

Examples of the electrolyte include lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$) and bistrifluoromethylsulfonylimide lithium ($LiN(CF_3SO_2)_2$), or a mixture thereof. Preferably, the electrolyte is hardly oxidized even at a high potential, and $LiPF_6$ is most preferred.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL); acetonitrile (AN); and sulfolane (SL). One of these solvents can be used alone as an organic solvent, or a mixed solvent of two or more of these solvents can be used as an organic solvent.

The gel-like nonaqueous electrolyte is a composite of a liquid electrolyte and a polymer material.

The nonaqueous electrolyte further contains a silyl group-containing compound containing a trialkylsilyl group and/or a trialkoxysilyl group. The nonaqueous electrolyte may or may not additionally contain the diisocyanate compound.

The concentration A of the silyl group-containing compound in the nonaqueous electrolyte satisfies the formula (2): 0 wt %<A≤2.0 wt %. The concentration A is preferably not less than 0.5% by weight. In addition, the concentration A is preferably not more than 1% by weight. In the secondary battery according to the embodiment in which the concentration A is in a preferable range, it is possible to further exhibit the effect that the silyl group-containing compound traps moisture while suppressing an increase in the resistance of the negative electrode due to formation of an excessive additional layer.

Examples of the silyl group-containing compounds include trimethylsilyl phosphate, triethylsilyl phosphate, tris-trimethylsilyl phosphate, vinyltrimethoxysilane, vinyltriethoxysilane, γ-glycidoxypropyltrimethoxysilane, γ-glycidoxypropyltriethoxysilane, γ-methacryloxypropyltrimethoxysilane, and γ-methacryloxypropyltriethoxysilane. The silyl group-containing compound can include, for example, at least one selected from the group consisting of these compounds.

The concentration B of the diisocyanate compound in the nonaqueous electrolyte satisfies the formula (3): 0 wt %≤B≤0.25 wt %. The concentration B is preferably not more than 0.1% by weight. In the secondary battery according to the embodiment in which the concentration B is in a preferable range, it is possible to further suppress an increase in the resistance of the negative electrode due to formation of an excessive additional layer. It is particularly preferable that the nonaqueous electrolyte does not contain a diisocyanate compound, that is, the concentration B is 0% by weight.

Examples of the diisocyanate compounds include isophorone diisocyanate, xylylene diisocyanate, dicyclohexylmethane diisocyanate, diphenylmethane diisocyanate, toluylene diisocyanate, and hexamethylene diisocyanate. The diisocyanate compound can include, for example, at least one selected from the group consisting of these compounds.

The concentrations A and B satisfy the formula (1): 0≤B/A≤0.5. The ratio B/A is preferably not more than 0.50. The ratio B/A is more preferably not more than 0.2. In the secondary battery according to the embodiment in which the ratio B/A is not more than 0.2, it is possible to further suppress an increase in the resistance of the negative electrode due to formation of an excessive additional layer.

(6) Negative Electrode Terminal

The negative electrode terminal can be formed of a material which is electrochemically stable at the Li ions insertion/extraction potential of the titanium-containing oxide contained in the negative electrode and has electro-conductivity. Specific examples of the material of the negative electrode terminal include copper, nickel, stainless steel and aluminum, and aluminum alloy containing at least one element selected from the group consisting of Mg, Ti, Zn, Mn, Fe, Cu, and Si. It is preferable to use aluminum or an aluminum alloy as the material of the negative electrode terminal. The negative electrode terminal is preferably formed of the same material as that of the negative electrode current collector in order to reduce the contact resistance with the negative electrode current collector.

(7) Positive Electrode Terminal

The positive electrode terminal can be formed of a material which is electrically stable in a potential range (vs. Li/Li$^+$) where the potential with respect to an oxidation-reduction potential of lithium is not less than 3 V and not more than 4.5 V and has electro-conductivity. Examples of the material of the positive electrode terminal include aluminum and aluminum alloy containing at least one element selected from the group consisting of Mg, Ti, Zn, Mn, Fe, Cu, and Si. The positive electrode terminal is preferably formed of the same material as that of the positive electrode current collector in order to reduce the contact resistance with the positive electrode current collector.

[Manufacturing Method]

The secondary battery according to the first embodiment can be manufactured, for example, according to the following procedure.

First, a battery including an electrode group and a nonaqueous electrolyte is manufactured by the following procedure.

In the fabrication of the electrode group, first, a negative electrode is produced. The negative electrode can be produced by the following procedure, for example. First, the above-described active material particles, conductive agent, and binder are provided. Then, they are suspended in an appropriate solvent to obtain a negative electrode slurry. The negative electrode slurry is applied onto both surfaces or one surface of a current collector such as an aluminum foil, and the coated layer is dried. Then, the dried layer is pressed together with the current collector. Thus, a negative electrode including the negative electrode current collector and the negative electrode active material-containing layer formed on the negative electrode current collector can be obtained. Alternatively, the negative electrode may be produced by forming active material particles, a conductive agent, and a binder into a pellet shape to obtain the negative electrode active material-containing layer, and forming the negative electrode active material-containing layer on the current collector.

On the other hand, the positive electrode is produced according to the procedure described above. Then, an electrode group is produced using the positive electrode, the negative electrode, and the separator.

Then, the nonaqueous electrolyte is prepared by the following procedure.

First, the electrolyte is dissolved in an organic solvent to obtain a mixture. Subsequently, a silyl group-containing compound and a diisocyanate compound are added to this mixture to obtain a nonaqueous electrolyte. In this case, the added amount is adjusted so as to satisfy the following formulas (4) to (6):

$$0.50 \leq T/(X \times Y) \leq 5 \quad (4),$$

$$0.050 \leq D/(X \times Y) \leq 1 \quad (5), \text{ and}$$

$$D/T \leq 5 \quad (6),$$

where, T is the added amount [mg] of the silyl group-containing compound contained in the nonaqueous electrolyte to be contained in the battery, and D is the added amount [mg] of the diisocyanate compound contained in the nonaqueous electrolyte to be contained in the battery. X is the specific surface area [m$^2$/g] of the active material particles contained in the negative electrode to be contained in the battery. Y is the weight [g] of the active material particles contained in the negative electrode to be contained in the battery. The weight Y can be adjusted by, for example, the mixing ratio of the active material particles in the negative electrode slurry and the application amount of the negative electrode slurry.

Then, the previously produced electrode group and the nonaqueous electrolyte are placed in the container member. Thus, a battery is obtained.

Then, the battery is subjected to initial charging. The initial charging is performed until the potential of the negative electrode reaches 0.5 to 1.6 V (vs. Li/Li$^+$). The initial charging can form a layer containing much N on the surface of the active material particles. This is because the nonaqueous electrolyte is prepared so as to satisfy the formulas (4) to (6), and the initial charging is performed under the above conditions, whereby a layer derived from the diisocyanate compound is more quickly formed than a layer derived from the silyl group-containing compound. Although the reaction between the nonaqueous electrolyte and the active material particles can also occur in the initial charging, deterioration of the active material particles due to the initial charging can be prevented by forming a layer containing N before the reaction. The initial charging can also almost completely consume the diisocyanate compound contained in the nonaqueous electrolyte. When the initial charging is performed such that the negative electrode potential is higher than 1.6 V (vs. Li/Li$^+$), the amount of Li$^+$ entering the negative electrode active material decreases, so that a battery capacity is not provided.

Then, the battery is subjected to initial discharging. Subsequently, the battery is subjected to approximately one or two charge-and-discharge cycles. The charge-and-discharge cycle can further form a layer containing much Si on the surface of the active material particles.

In addition, the concentration A of the silyl group-containing compound and the concentration B of the diisocyanate compound in the nonaqueous electrolyte can be adjusted by adjusting the conditions of the initial charging and the conditions of the charge-and-discharge cycle.

Thus, the secondary battery according to the first embodiment can be obtained. Specific examples of production conditions will be described in more detail in the following [Examples].

[Various Measurement Methods]

Hereinafter, a method of measuring each parameter of the secondary battery will be described.

(Pretreatment)

Prior to each measurement, the secondary battery to be measured is subjected to pretreatment by the following procedure.

First, the secondary battery is discharged from the viewpoint of safety. Although it is preferable to perform discharging to a lower limit of nominal voltage of the secondary battery to be measured, the discharge end voltage is not particularly limited.

Then, the secondary battery is transferred into a glove box filled with argon (hereinafter this glove box is referred to as the argon box). Among them, the container member of the secondary battery is cut opened. The electrode group and the nonaqueous electrolyte are taken out from the cut-open container member.

The negative electrode and the positive electrode are taken out from the taken-out electrode group by, for example, cutting the separator. The taken-out negative electrode is washed with a solvent to remove the electrolyte adhered to the negative electrode. As the solvent used here, for example, diethyl carbonate, dimethyl carbonate, methylethyl carbonate or the like can be used. Specifically, the negative electrode is preferably washed with a solvent the same as the organic component of the nonaqueous electrolyte except for the electrolyte.

The washed negative electrode is then dried in the argon box. The dried negative electrode is used as a negative electrode sample.

The positive electrode taken out from the electrode group is washed and then dried in the same manner as the negative electrode, so that a positive electrode sample can be obtained. The taken-out nonaqueous electrolyte is stored for the following analysis.

(Method for Confirming Elements in Active Material Composite)

The negative electrode sample is covered with a film containing a heavy element. As the heavy element, for example, Ru can be used. For the covering, a sputtering method can be used, for example. Then, the covered negative electrode sample is embedded in a resin, for example, an epoxy resin or the like to produce a resin-embedded sample. A thin film sample in which the cross section of the active material particle is exposed is produced from the resin-embedded sample by processing such as ion milling.

Then, the produced thin film sample is observed using a transmission electron microscope (TEM) equipped with an energy dispersive X-ray spectrometer (EDX). In this observation, it can be confirmed whether or not a layer is formed on the surface of the active material particles. An observation site of the active material particle cross section is specified by TEM and analyzed in the field of view by EDX, whereby distribution of N and Si, for example, in the layer can be confirmed. In addition, it can be confirmed by TEM-EDX analysis whether or not the active material particles contain Ti and O, that is, whether or not the active material particles contain titanium-containing oxide.

(Method for Calculating Average Thickness of Layer and Average Thickness of Layer Containing Carbon)

The average thickness of the layer of the active material composite can be calculated from a cross-sectional image obtained by TEM observation. When the active material particles include a layer containing carbon covering the surface of the titanium-containing oxide particles, the average thickness of the layer containing carbon can also be calculated from the cross-sectional image obtained by TEM observation. In calculating the average thickness of each of the layer and the layer containing carbon, a value obtained by averaging measurement results at arbitrary five points on the surface of the active material particles is taken as the average thickness.

(Method for Specifying Compound Contained in Active Material Particles)

[Composition]

The composition of the compound contained in the active material particles contained in the negative electrode can be confirmed by combining TEM-EDX described above and analysis by inductively coupled plasma (ICP) emission spectroscopy described below.

First, according to TEM-EDX, it is possible to quantitatively analyze the elements B to U in the periodic table of elements in the TEM observation field of view.

In addition, according to the ICP emission spectroscopy, the concentration of a metal element containing Li contained in the active material particles can be confirmed. Specifically, the analysis by ICP emission spectroscopy is carried out according to the following procedure. First, the negative electrode sample is placed in a suitable solvent and irradiated with ultrasonic waves. For example, an electrode is put in ethyl methyl carbonate placed in a glass beaker and vibrated in an ultrasonic washer, whereby the electrode layer containing the negative electrode active material can be peeled off from a current collector. Then, the peeled negative electrode active material-containing layer is dried in a reduced pressure to dry it. The obtained negative electrode active material-containing layer is pulverized using a mortar or the like to obtain a powder including the active material particles, the conductive agent, the binder, and the like. The resulting powder is dissolved in an acid to produce a liquid sample containing the compound contained in the active material. At that time, hydrochloric acid, nitric acid, sulfuric acid or hydrogen fluoride may be used as the acid. The liquid sample is subjected to the ICP emission spectroscopy, whereby compositions of metal elements (including Li) contained in the active material particles can be known.

The composition of the compound contained in the active material particles can be determined based on the results of the TEM-EDX analysis and the ICP emission spectroscopic analysis obtained as described above. When plural kinds of compounds are contained in the active material particles, the composition and mixing ratio of each compound can be confirmed based on the above analysis results.

[Crystal Structure]

The crystal structure of the compound contained in the active material particles contained in the negative electrode can be confirmed by crystal structure analysis using a powder X-ray diffraction apparatus described below.

As the powder X-ray diffraction measurement apparatus, SmartLab, manufactured by Rigaku Corporation, is used. The measurement conditions are: Cu target; 45 kV 200 mA; Solar Slit: 5° in both incident light and reception light; step width: 0.02 degrees; scan speed: 20 degrees/minute; semiconductor detector: D/teX Ultra 250; sample plate holder: flat glass sample plate holder (thickness: 0.5 mm); measurement range: a range of $5° \leq 2\theta \leq 90°$. When another apparatus is used, measurement using a standard Si powder for powder X-ray diffraction is performed to find conditions for obtaining measurement results of peak intensity, half-width and diffraction angle equivalent to results obtained by the above apparatus, and samples are measured under this condition.

When the measurement is to be performed, a negative electrode sample is first cut into a size almost equal to the size of a holder of the powder X-ray diffraction apparatus to obtain a measurement sample.

The obtained measurement sample is directly attached to a glass holder of the powder X-ray diffraction apparatus, and the measurement can be performed. In this case, the position of the peak originated from the current collector such as a metal foil is measured in advance. The peaks of other components such as a conductive agent and a binder are also measured in advance. When the peaks of the current collector and the active material overlap to each other, it is desirable that the negative electrode active material-containing layer is separated from the current collector, and subjected to measurement. This is in order to separate the overlapping peaks when quantitatively measuring the peak intensity. For example, the negative electrode active material-containing layer can be separated by irradiating the negative electrode sample with an ultrasonic wave in a solvent. Then, the separated negative electrode active material-containing layer is sealed into a capillary, mounted on a rotary sample table, and measured. As a result of this process, the XRD pattern of the active material can be obtained with the influence of the orientation reduced.

The XRD pattern obtained as described above is analyzed by the Rietveld method. In the Rietveld method, a diffraction pattern is calculated from a crystal structure model which has been previously estimated. The crystal structure model can be estimated from the composition of the compound obtained from the result of the TEM-EDX analysis and the result of the ICP emission spectroscopic analysis. The parameters of the crystal structure (lattice constant, atomic coordinate, and crystal site occupancy ratio or the like) can be precisely analyzed by fitting all the calculated values and measurement values. Thereby, the characteristics of the crystal structure of the active material can be determined. A fitting parameter S is used as the scale for estimating the degree of agreement between the measured intensities and the calculated intensities in the Rietveld analysis. The S value must be less than 1.8 in the analysis. When determining an occupancy ratio g in each site, a standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (2nd edit., Asakura Publishing Co., Ltd., issued on Jul. 10, 2009, p. 97-115).

Using the above method, information on the crystal structure of the compound contained in the active material particles contained in the negative electrode sample can be obtained.

By the above procedure, it is possible to specify the composition and the crystal structure of the compound of the active material particles contained in the negative electrode. Also, by following the same procedure for the positive electrode sample, it is possible to specify the composition and the crystal structure of the positive electrode active material contained in the positive electrode.

(Method of Confirming Composition of Nonaqueous Electrolyte)

The composition of the nonaqueous electrolyte contained in the secondary battery is confirmed by the following procedure. First, the nonaqueous electrolyte taken out in the above "Pretreatment" is provided. This nonaqueous electrolyte is diluted with acetone in a glove box to prepare a measurement sample. A component contained in this measurement sample is specified using a gas chromatograph mass spectrometer (GC/MS). Then, a calibration curve is made using as a reagent the same material as the component contained in the measurement sample. By using this calibration curve, it is possible to calculate a component concentration in the measurement sample and, in addition, the concentration of a component contained in the nonaqueous electrolyte. For compounds which are difficult to detect with GC/MS, NMR (nuclear magnetic resonance) measurement of a nuclide $^1$H is performed after dilution with deuterated acetone in the glove box, and, similarly, the calibration curve is used to specify the material and calculate the concentration.

Next, the secondary battery according to the first embodiment will be described in more detail with reference to the drawings.

Figure 4:
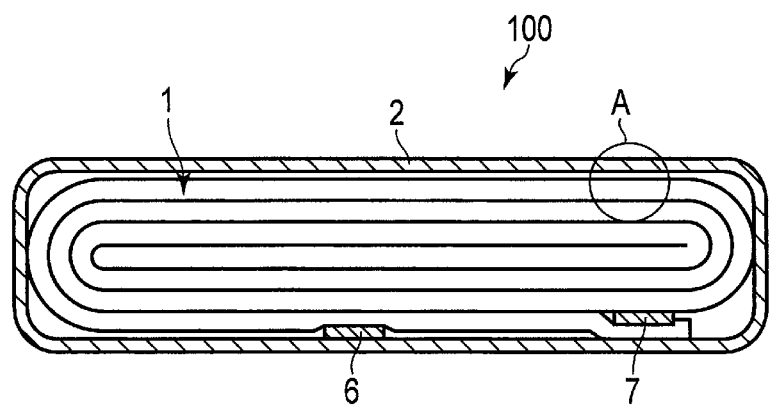
FIG. 4 is a cross-sectional view schematically showing an example of the secondary battery according to the embodiment.
Figure 5:
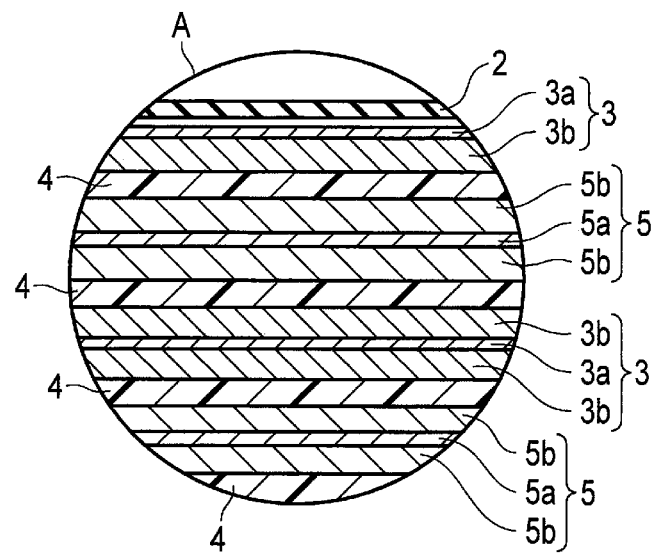
FIG. 5 is an enlarged cross-sectional view of an A portion of the secondary battery shown in FIG. 4.

FIG. 4 is a cross-sectional view schematically showing an example of the secondary battery according to the first embodiment. FIG. 5 is an enlarged cross-sectional view of an A portion of the secondary battery shown in FIG. 4.

The secondary battery 100 shown in FIGS. 4 and 5 includes a bag-shaped container member 2 shown in FIG. 4, an electrode group 1 shown in FIGS. 4 and 5, and an electrolyte (not shown). The electrode group 1 and the electrolyte are contained in the bag-shaped container member 2. An electrolyte (not shown) is held by the electrode group 1.

The bag-shaped container member 2 is formed of a laminate film including two resin layers and a metal layer interposed therebetween.

As shown in FIG. 4, the electrode group 1 is a flat wound electrode group. As shown in FIG. 5, the flat wound electrode group 1 includes the negative electrode 3, the separator 4, and the positive electrode 5. The separator 4 is interposed between the negative electrode 3 and the positive electrode 5.

The negative electrode 3 includes a negative electrode current collector 3a and a negative electrode active material-containing layer 3b. In a portion of the negative electrode 3 located at the outermost layer of the wound electrode group 1, as shown in FIG. 5, the negative electrode active material-containing layer 3b is formed only on an inner surface side of the negative electrode current collector 3a. In the other portion of the negative electrode 3, the negative electrode active material-containing layers 3b are formed on both surfaces of the negative electrode current collector 3a.

The positive electrode 5 includes a positive electrode current collector 5a and positive electrode active material-containing layers 5b formed on both sides thereof.

As shown in FIG. 4, the negative electrode terminal 6 and the positive electrode terminal 7 are located near an outer peripheral end of the wound electrode group 1. The negative electrode terminal 6 is connected to a portion of the negative electrode current collector 3a located at the outermost layer. On the other hand, the positive electrode terminal 7 is connected to a portion of the positive electrode current collector 5a located at the outermost layer. The negative electrode terminal 6 and the positive electrode terminal 7 are extended outside from an opening of the bag-shaped container member 2. A thermoplastic resin layer is disposed on an inner surface of the bag-shaped container member 2, and the opening is closed by thermal fusion bonding the thermoplastic resin layer.

Figure 6:
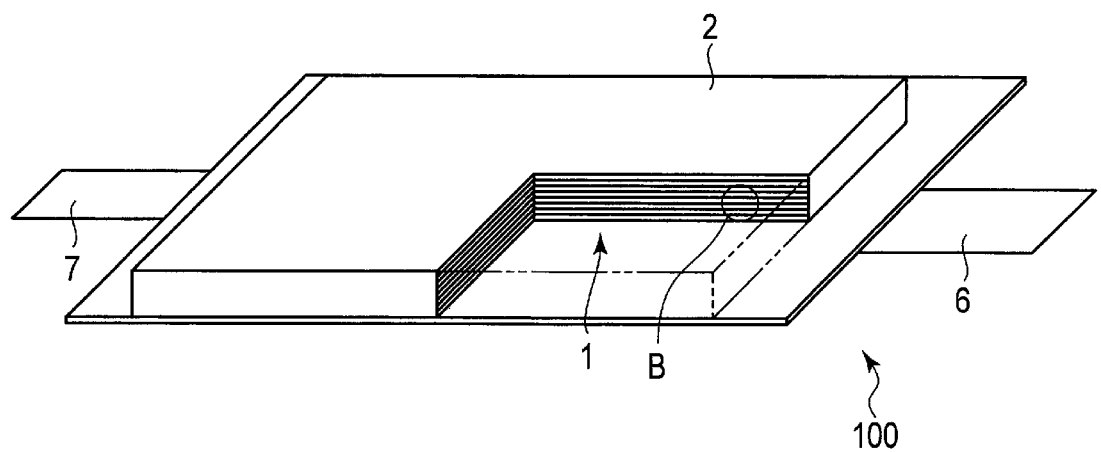
FIG. 6 is a partially broken perspective view schematically showing another example of the secondary battery according to the embodiment.
Figure 7:
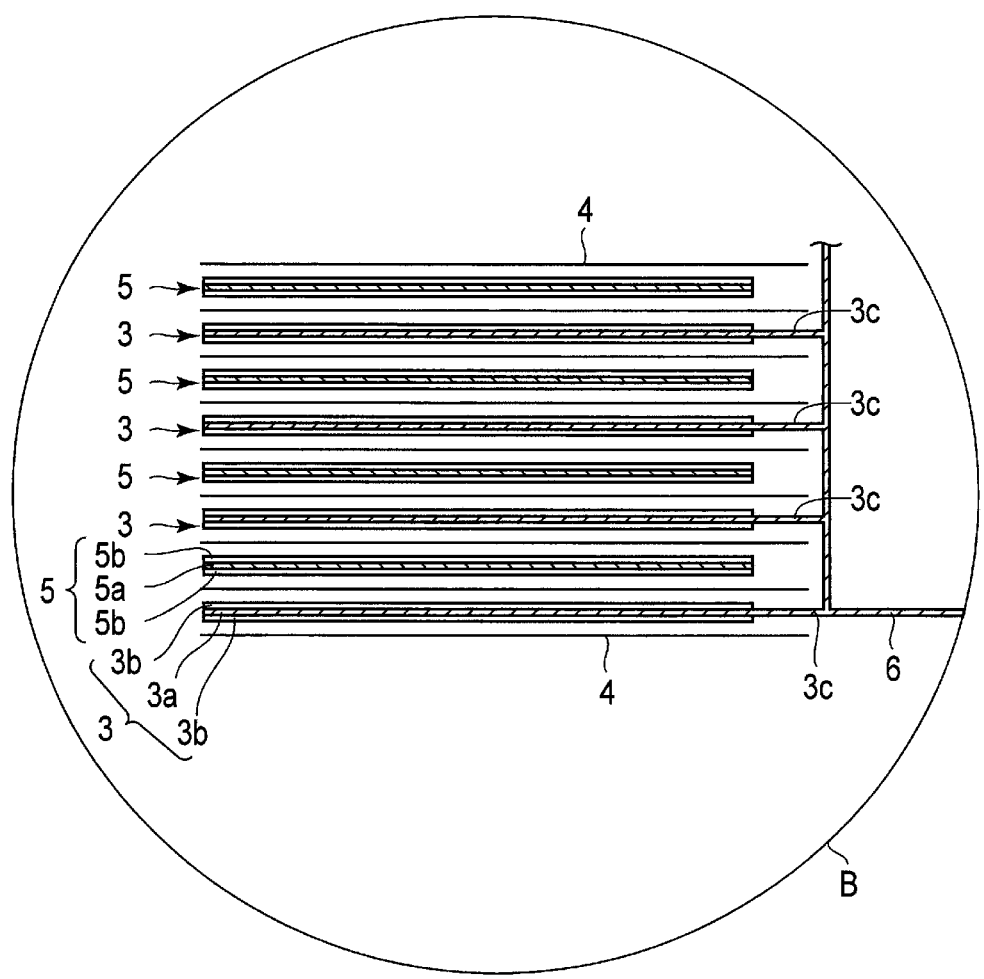
FIG. 7 is an enlarged cross-sectional view of a B portion of the secondary battery shown in FIG. 6.

The secondary battery according to the first embodiment is not limited to the secondary battery having the configuration shown in FIGS. 4 and 5, and may be, for example, the battery having the configuration shown in FIGS. 6 and 7.

FIG. 6 is a partially broken perspective view schematically showing another example of the secondary battery according to the first embodiment. FIG. 7 is an enlarged cross-sectional view of a B portion of the secondary battery shown in FIG. 6.

The secondary battery 100 shown in FIGS. 6 and 7 includes the electrode group 1 shown in FIGS. 6 and 7, the container member 2 shown in FIG. 6, and an electrolyte (not shown). The electrode group 1 and the nonaqueous electrolyte are contained in the container member 2. The electrolyte is held in the electrode group 1.

The container member 2 is formed of a laminate film including two resin layers and a metal layer interposed therebetween.

As shown in FIG. 7, the electrode group 1 is a stacked-type electrode group. The stacked-type electrode group 1 has a structure in which the negative electrodes 3 and the positive electrodes 5 are alternately stacked with the separators 4 being interposed therebetween.

The electrode group 1 includes a plural of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plural of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 7, the portion 3c serving as the negative electrode tab does not overlap the positive electrode 5. A plural of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

According to the first embodiment, a secondary battery is provided. The negative electrode of the secondary battery includes an active material composite. The active material composite includes active material particles including titanium-containing oxide particles and a layer covering at least a portion of the surfaces of the active material particles. An N concentration in the layer decreases from the first surface to the second surface. A Si concentration in the layer increases from the first surface to the second surface. The nonaqueous electrolyte satisfies the following formula (1): $0 \leq B/A \leq 0.5$; (2): $0 \text{ wt \%} < A \leq 2.0 \text{ wt \%}$; and (3): $0 \text{ wt \%} \leq B \leq 0.25 \text{ wt \%}$. In this secondary battery, while sufficiently suppressing the resistance of the negative electrode, it is possible to sufficiently suppress the reaction between the active material particles and the nonaqueous electrolyte and to suppress gas generation. Consequently, the secondary battery can exhibit excellent cycle life characteristics at low temperature and excellent cycle life characteristics at high temperature.

Second Embodiment

According to the second embodiment, a battery module is provided. The battery module according to the second embodiment includes a plural of the secondary battery according to the first embodiment.

In the battery module according to the second embodiment, individual single batteries may be arranged to be electrically connected in series or in parallel, or may be arranged in combination of series connection and parallel connection.

Next, an example of the battery module according to the second embodiment will be described with reference to drawings.

FIG. 8 is a perspective view schematically showing an example of the battery module according to the second embodiment. An battery module 200 shown in FIG. 8 includes five single batteries 100a to 100e, four bus bars 21, a positive electrode side lead 22, and a negative electrode side lead 23. Each of the five single batteries 100a to 100e is the secondary battery according to the first embodiment.

The bus bar 21 connects, for example, the negative electrode terminal 6 of the single battery 100a and the positive electrode terminal 7 of the adjacent single battery 100b. Thus, the five single batteries 100 are electrically connected in series by the four bus bars 21. Namely, the battery module 200 shown in FIG. 8 is a five battery series-connected battery module.

As shown in FIG. 8, the positive electrode terminal 7 of the single battery 100a located at the left end among the five single batteries 100a to 100e is electrically connected to the positive electrode side lead 22 for external connection. The negative electrode terminal 6 of the single battery 100e located at the right end among the five single batteries 100a to 100e is electrically connected to the negative electrode side lead 23 for external connection.

The battery module according to the second embodiment includes the secondary battery according to the first embodiment. Accordingly, the battery module according to the second embodiment can exhibit excellent cycle life characteristics at low temperature and excellent cycle life characteristics at high temperature.

Third Embodiment

According to the third embodiment, a battery pack is provided. The battery pack includes the battery module according to the second embodiment. The battery pack may include the single secondary battery according to the first embodiment instead of the battery module according to the second embodiment.

The battery pack according to the third embodiment may further comprise a protective circuit. The protective circuit has a function of controlling charge/discharge of the secondary battery. Alternatively, a circuit included in a device (such as an electronic device and an automobile) using a battery pack as a power supply may be used as a protective circuit of the battery pack.

The battery pack of the third embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 9:
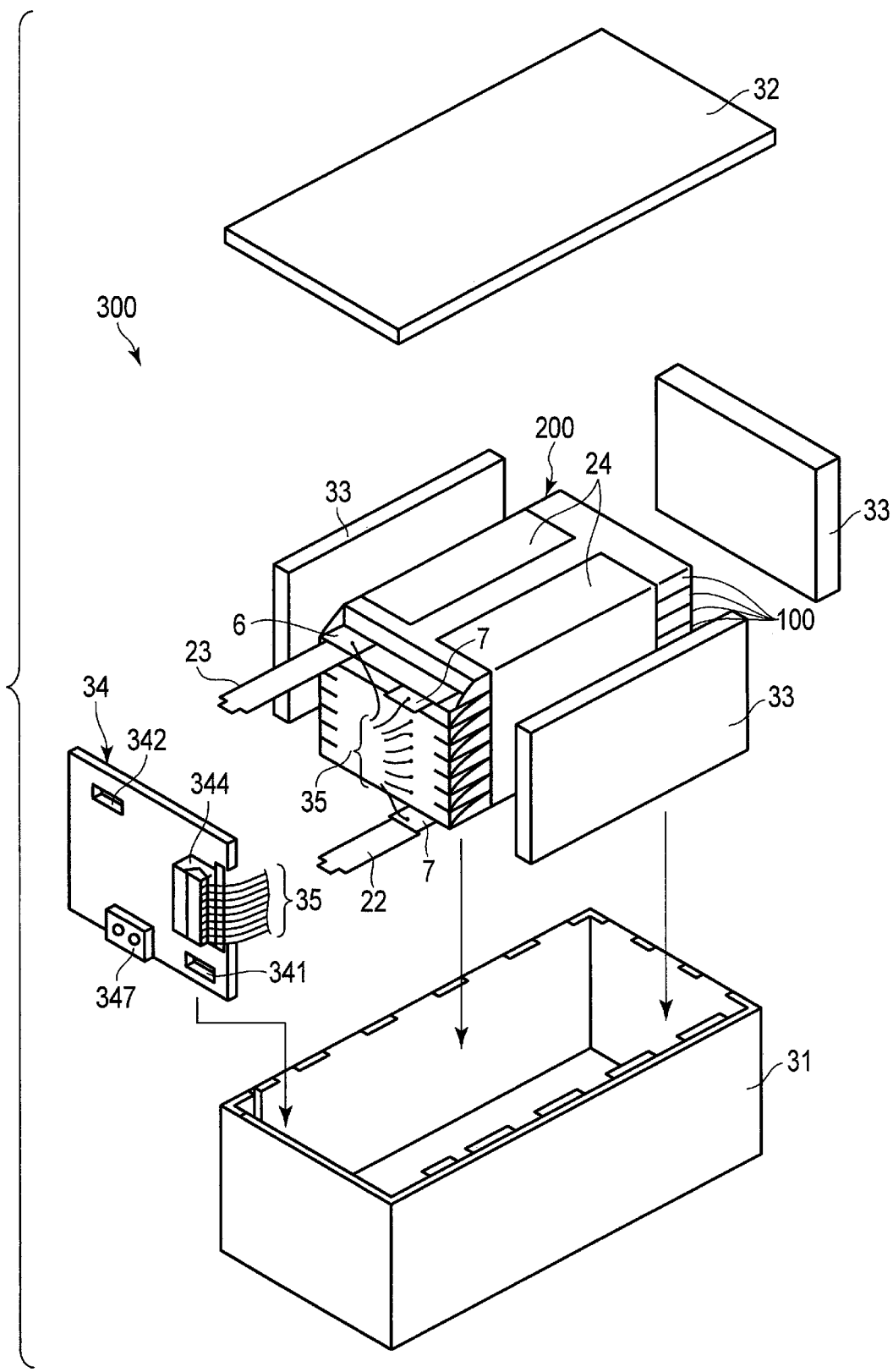
FIG. 9 is an exploded perspective view schematically showing an example of a battery pack according to the embodiment.

FIG. 9 is an exploded perspective view schematically showing an example of the battery pack according to the third embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 may have a structure shown in FIGS. 4 and 5, for example. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is electrically connected to the positive electrode terminal 7 of the single-battery 100 located lowermost in the stack of the single-batteries 100. One end of the negative electrode-side lead 23 is electrically connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is electrically connected to the external power distribution terminal 347 via the plus-side wire 348a. The protective circuit 344 is electrically connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting overcharge or the like for each of the single batteries 100, the battery voltage may be detected, or a positive electrode potential or negative electrode potential may be detected. In the latter case, a lithium electrode to be used as a reference electrode may be inserted into each single-battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded under a large current. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the third embodiment includes the secondary battery according to the first embodiment or the battery module according to the second embodiment. Accordingly, the battery pack according to the third embodiment can exhibit excellent output performance and excellent cycle life performance.

Fourth Embodiment

According to the fourth embodiment, a vehicle is provided. The vehicle is mounted with the battery pack according to the third embodiment.

In the vehicle according to the fourth embodiment, the battery pack is configured, for example, to recover regenerative energy from motive force of the vehicle. In the vehicle according to the fourth embodiment, the battery pack may include, for example, a mechanism configured to convert kinetic energy into regenerative energy.

Examples of the vehicle according to the fourth embodiment include two-wheeled to four-wheeled hybrid electric automobiles, two-wheeled to four-wheeled electric automobiles, electrically assisted bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

The vehicle according to the fourth embodiment may have plural battery packs installed. In such a case, the battery packs may be electrically connected in series, electrically connected in parallel, or electrically connected in a combination of in-series connection and in-parallel connection.

An example of the vehicle according to the fourth embodiment is explained below, with reference to the drawings.

FIG. 11 is a cross-sectional view schematically showing an example of a vehicle according to the fourth embodiment.

A vehicle 400, shown in FIG. 11 includes a vehicle body 40 and a battery pack 300 according to the third embodiment. In the example shown in FIG. 11, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 11, shown is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 12, an aspect of operation of the vehicle according to the fourth embodiment is explained.

FIG. 12 is a view schematically showing an example of the vehicle according to the fourth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, EMU (a battery management unit) 411, and a communication bus 412.

The three battery packs 300a, 300b and 300c are electrically connected to each other in series. The battery pack 300a includes a battery module 200a and a battery module monitoring unit (VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single batteries connected to each other in series. At least one of the plural single batteries is the secondary battery according to the first embodiment. The battery modules 200a to 200c each perform charging and discharging through a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single battery in the battery modules 200a to 200c based on communications from the battery management unit 411. It is possible, however, to measure the temperatures only at several points per battery module, and the temperatures of all of the single batteries need not be measured.

The vehicle power source 41 may also have an electromagnetic contactor (for example, a switch unit 415 shown in FIG. 12) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal supplied to a coil located near a switch element.

The inverter 44 converts an inputted DC (direct current) voltage to a three-phase AC (alternate current) high voltage for driving a motor. Three-phase output terminal(s) of the inverter 44 is connected to each three-phase input terminal of the drive motor 45. The inverter 44 controls an output voltage based on control signals from the battery management unit 411 or the vehicle ECU 42, which controls the whole operation of the vehicle.

The drive motor 45 is rotated by electric power supplied from the inverter 44. The rotation is transferred to an axle and driving wheels W, for example, through a differential gear unit.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected through a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected through the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 through communication lines.

The vehicle according to the fourth embodiment includes the battery pack according to the third embodiment. The vehicle according to the fourth embodiment, therefore, can exhibit excellent life characteristics at low temperature and excellent life characteristics at high temperature, the vehicle according to the fourth embodiment can exhibit high reliability in a wide temperature environment.

EXAMPLES

Although examples will be described below, the present embodiment is not limited to the following examples, so long as it does not depart from the spirit of the present embodiment.

Example 1

A secondary battery was manufactured by the following procedure.

<Production of Positive Electrode>

As a positive electrode active material, a lithium nickel composite oxide ($LiNi_{0.5}Co_{0.2}Mn_{0.3}O_2$) powder was provided. As a conductive agent, acetylene black was provided. As a binding agent, polyvinylidene fluoride (PVdF) was provided. Then, the positive electrode active material, the conductive agent, and the binder were added to N-methylpyrrolidone (NMP) at a ratio of 90 parts by weight:10 parts by weight:10 parts by weight and mixed to prepare a positive electrode slurry. The positive electrode slurry was applied onto both surfaces of a current collector formed of an aluminum foil having a thickness of 15 μm. Then, the coated layer was dried in a thermostatic chamber at 120° C. and pressed. Thus, a positive electrode was obtained.

<Production of Negative Electrode>

As a negative electrode active material, a niobium-titanium composite oxide ($Nb_2TiO_7$) powder coated with a 2 nm carbon layer was provided. The niobium titanium composite oxide had a form of secondary particles. The average secondary particle size of the niobium titanium composite oxide was 7.5 μm. The specific surface area X of the niobium titanium composite oxide was 4.0 m²/g. In addition, acetylene black was provided as a conductive agent, and polyvinylidene fluoride (PVdF) was provided as a binder. Then, the negative electrode active material, the conductive agent, and the binder were added to N-methylpyrrolidone (NMP) at a ratio of 90 parts by weight:10 parts by weight:10 parts by weight and mixed to prepare a negative electrode slurry. The negative electrode slurry was applied onto both surfaces of a current collector formed of an aluminum foil having a thickness of 15 μm. Then, the coated layer was dried in a thermostatic chamber at 120° C. and pressed. Thus, a negative electrode was obtained.

<Production of Electrode Group>

Two polyethylene nonwoven fabrics having a thickness of 25 μm were provided as separators. Then, the positive electrode, the separator, the negative electrode, and the separator were stacked in this order to obtain a laminate. Then, the laminate was spirally wound. This was heat-pressed at 80° C. to produce a flat electrode group. In the above production of the negative electrode, the application amount of the negative electrode slurry was adjusted such that the weight of the negative electrode active material contained in the produced electrode group was 7.3 g.

<Storage of Electrode Group>

Next, a container formed of a laminate film having a three-layer structure of nylon layer/aluminum layer/polyethylene layer and having a thickness of 0.1 mm was provided. The electrode group produced as described above was stored in the container. Then, while a portion of a peripheral portion of the container opened, the interior of the container was dried in a vacuum at 80° C. for 16 hours.

<Preparation of Liquid Nonaqueous Electrolyte>

$LiPF_6$ as an electrolyte was dissolved in a mixed solvent of propylene carbonate (PC) and diethyl carbonate (DEC) (volume ratio being 1:2) at a concentration of 1 mol/L. In addition, trimethylsilyl phosphate and hexamethylene diisocyanate as additives were dissolved in a mixed solvent at added amounts T and D shown in Table 1 below. The added amount T shown in Table 1 is the content [mg] of the silyl group-containing compound in the nonaqueous electrolyte to be contained in the battery, and the added amount D is the content [mg] of the diisocyanate compound in the nonaqueous electrolyte to be contained in the battery. Thus, a liquid nonaqueous electrolyte was obtained. The preparation of the nonaqueous electrolyte was carried out in an argon box.

<Manufacturing of Battery>

A nonaqueous electrolytic solution was injected into a container storing the electrode group. Then, the open portion of the peripheral portion of the container was heat-sealed to hermetically seal the container. Consequently, a battery having an outside dimension without tab of 11 cm×8 cm×0.3 cm and a dimension of portion inside a hermetically sealed portion of 9 cm×7 cm×0.25 cm was obtained.

<First Charging>

A battery was subjected to initial charging under the environment of 25° C. by the following procedure. First, the battery was charged at a constant current (CC) of 0.2 C to a voltage of 3 V. Then, the battery was charged at a constant voltage (CV) of 3 V. Constant voltage charging was terminated once the total time for constant current-constant voltage charging reached 10 hours. In the constant voltage charging, the conditions were adjusted such that the charge termination potential of the negative electrode in the initial charging was 1.25 V (vs. $Li/Li^+$).

<Initial Discharging>

Next, the battery was discharged at a constant current (CC) of 0.2 C to a voltage of 1.5 V under the environment of 25° C.

<Charge-and-Discharge Cycle>

Next, the battery was subjected to the charge-and-discharge cycle under the environment of 25° C. by the following procedure. First, the battery was charged at a constant current (CC) of 0.2 C to a voltage of 3 V. Then, the battery was charged at a constant voltage (CV) of 3 V until the current value reached 1/20 C. That is, the battery was subjected to constant current constant voltage (CCCV) charging. Then, the battery was discharged at a constant current (CC) of 0.2 C to a voltage of 1.5 V.

Thus, the secondary battery of Example 1 was manufactured.

Examples 2 to 22 and Comparative Examples 1 to 5

In each of Examples 2 to 22 and Comparative Examples 1 to 5, each secondary battery was manufactured by the same procedure as in Example 1 except that the conditions described in the following Tables 1 to 3 and Tables 6 to 8 were employed. In the following Tables 1 to 3 and Tables 6 to 8, the conditions that were not changed from those of Example 1 are described as "Example 1". In particular, in the initial charging of each secondary battery, the conditions were appropriately changed so that the charge termination potential of the negative electrode would be the potential shown in Table 3.

The negative electrode active materials used in all Examples and Comparative Examples had a form of secondary particles. Accordingly, the average particle sizes shown in the following Table 1 are all the average secondary particle sizes.

TABLE 1

| | Positive electrode active material Composition | Negative electrode active material | | | |
|---|---|---|---|---|---|
| | | Composition | Average secondary particle size [μm] | Specific surface area X [m²/g] | Weight Y [g] |
| Example 1 | $LiNi_{0.5}Co_{0.2}Mn_{0.3}O_2$ | $Nb_2TiO_7$ | 7.5 | 4.0 | 7.3 |
| Example 2 | Example 1 | Example 1 | Example 1 | Example 1 | Example 1 |
| Example 3 | Example 1 | Example 1 | Example 1 | Example 1 | Example 1 |
| Comparative Example 1 | Example 1 | Example 1 | Example 1 | Example 1 | Example 1 |
| Comparative Example 2 | Example 1 | Example 1 | Example 1 | Example 1 | Example 1 |
| Example 4 | $LiNi_{0.6}Co_{0.2}Mn_{0.2}O_2$ | Example 1 | Example 1 | Example 1 | Example 1 |
| Example 5 | $LiNi_{0.33}Co_{0.33}Mn_{0.33}O_2$ | Example 1 | Example 1 | Example 1 | Example 1 |

TABLE 1-continued

| | Positive electrode active material Composition | Negative electrode active material Composition | Average secondary particle size [μm] | Specific surface area X [m²/g] | Weight Y [g] |
|---|---|---|---|---|---|
| Example 6 | LiNiO$_2$ | Example 1 | Example 1 | Example 1 | Example 1 |
| Example 7 | LiCoO$_2$ | Example 1 | Example 1 | Example 1 | Example 1 |
| Example 8 | Li$_2$Mn$_2$O$_4$ | Example 1 | Example 1 | Example 1 | Example 1 |
| Example 9 | LiFePO$_4$ | Example 1 | Example 1 | Example 1 | Example 1 |
| Example 10 | LiMnPO$_4$ | Example 1 | Example 1 | Example 1 | Example 1 |
| Example 11 | Example 1 | Li$_4$Ti$_5$O$_{12}$ | 7 | 6 | 9.6 |
| Example 12 | Example 1 | Li$_2$Na$_2$Ti$_6$O$_{14}$ | 6.2 | 5.7 | 6.8 |
| Example 13 | Example 1 | Li$_2$SrTi$_6$O$_{14}$ | 6.1 | 6.1 | 6.8 |
| Example 14 | Example 1 | Li$_2$Na$_{1.5}$Ti$_{5.5}$Nb$_{0.5}$O$_{14}$ | 5.8 | 3.5 | 6.8 |
| Example 15 | Example 1 | Li$_2$Sr$_{0.75}$Ti$_{5.5}$Nb$_{0.5}$O$_{14}$ | 6.0 | 4.2 | 6.8 |
| Example 16 | Example 1 | TiO$_2$ (B) | 5.4 | 8 | 6.8 |
| Example 17 | Example 1 | Example 1 | Example 1 | Example 1 | Example 1 |
| Example 18 | Example 1 | Example 1 | Example 1 | Example 1 | Example 1 |
| Example 19 | Example 1 | Example 1 | Example 1 | Example 1 | Example 1 |
| Example 20 | Example 1 | Example 1 | Example 1 | Example 1 | Example 1 |
| Comparative Example 3 | Example 1 | Example 1 | Example 1 | Example 1 | Example 1 |
| Comparative Example 4 | Example 1 | Example 1 | Example 1 | Example 1 | Example 1 |
| Comparative Example 5 | Example 1 | Example 1 | Example 1 | Example 1 | Example 1 |
| Example 21 | Example 1 | Example 1 | Example 1 | Example 1 | 5.3 |

TABLE 2

| | Silyl group-containing compound | Added amount T [mg] | Diisocyanate compound | Added amount D [mg] |
|---|---|---|---|---|
| Example 1 | Trimethylsilyl phosphate | 53 | Hexamethylene diisocyanate | 13 |
| Example 2 | Example 1 | Example 1 | Example 1 | 21 |
| Example 3 | Example 1 | Example 1 | Example 1 | 26 |
| Comparative Example 1 | Example 1 | Example 1 | Example 1 | 53 |
| Comparative Example 2 | — | — | — | — |
| Example 4 | Example 1 | Example 1 | Example 1 | Example 1 |
| Example 5 | Example 1 | Example 1 | Example 1 | Example 1 |
| Example 6 | Example 1 | Example 1 | Example 1 | Example 1 |
| Example 7 | Example 1 | Example 1 | Example 1 | Example 1 |
| Example 8 | Example 1 | Example 1 | Example 1 | Example 1 |
| Example 9 | Example 1 | Example 1 | Example 1 | Example 1 |
| Example 10 | Example 1 | Example 1 | Example 1 | Example 1 |
| Example 11 | Example 1 | Example 1 | Example 1 | Example 1 |
| Example 12 | Example 1 | Example 1 | Example 1 | Example 1 |
| Example 13 | Example 1 | Example 1 | Example 1 | Example 1 |
| Example 14 | Example 1 | Example 1 | Example 1 | Example 1 |
| Example 15 | Example 1 | Example 1 | Example 1 | Example 1 |
| Example 16 | Example 1 | Example 1 | Example 1 | Example 1 |
| Example 17 | Example 1 | Example 1 | Diphenylmethanediisocyanate | Example 1 |
| Example 18 | Example 1 | Example 1 | Toluene diisocyanate | Example 1 |
| Example 19 | Vinyltrimethoxysilane | Example 1 | Example 1 | Example 1 |
| Example 20 | γ-methacryloxypropyltrimethoxysilane | Example 1 | Example 1 | Example 1 |
| Comparative Example 3 | Example 1 | 13 | Example 1 | Example 1 |
| Comparative Example 4 | Example 1 | 150 | Example 1 | Example 1 |
| Comparative Example 5 | Example 1 | Example 1 | Example 1 | 1.3 |
| Example 21 | Example 1 | Example 1 | Example 1 | Example 1 |

TABLE 3

| | T/(X × Y) | D/(X × Y) | D/T | Charge cut-off potential of negative electrode in initial charging [V (vs. Li/Li$^+$)] |
|---|---|---|---|---|
| Example 1 | 1.82 | 0.45 | 0.25 | 1.25 |
| Example 2 | Example 1 | 0.72 | 0.40 | Example 1 |
| Example 3 | Example 1 | 0.89 | 0.49 | Example 1 |
| Comparative Example 1 | Example 1 | 1.82 | 1.00 | Example 1 |
| Comparative Example 2 | — | — | — | Example 1 |
| Example 4 | Example 1 | Example 1 | Example 1 | 1.20 |
| Example 5 | Example 1 | Example 1 | Example 1 | Example 1 |
| Example 6 | Example 1 | Example 1 | Example 1 | Example 1 |
| Example 7 | Example 1 | Example 1 | Example 1 | Example 1 |
| Example 8 | Example 1 | Example 1 | Example 1 | Example 1 |
| Example 9 | Example 1 | Example 1 | Example 1 | Example 1 |
| Example 10 | Example 1 | Example 1 | Example 1 | Example 1 |
| Example 11 | 0.92 | 0.23 | Example 1 | 1.50 |
| Example 12 | 1.37 | 0.34 | Example 1 | 1.00 |
| Example 13 | 1.28 | 0.31 | Example 1 | 1.00 |
| Example 14 | 2.23 | 0.55 | Example 1 | 1.00 |
| Example 15 | 1.86 | 0.46 | Example 1 | 1.00 |
| Example 16 | 0.97 | 0.24 | Example 1 | 1.40 |
| Example 17 | Example 1 | Example 1 | Example 1 | Example 1 |
| Example 18 | Example 1 | Example 1 | Example 1 | Example 1 |
| Example 19 | Example 1 | Example 1 | Example 1 | Example 1 |
| Example 20 | Example 1 | Example 1 | Example 1 | Example 1 |
| Comparative Example 3 | 0.45 | Example 1 | 1 | Example 1 |
| Comparative Example 4 | 5.14 | Example 1 | 0.09 | Example 1 |
| Comparative Example 5 | Example 1 | 0.045 | 0.025 | Example 1 |
| Example 21 | 2.5 | 0.61 | Example 1 | 0.7 |

Comparative Examples 6 to 19

In each of Comparative Examples 6 to 19, each secondary battery was manufactured by the same procedure as in Examples 4 to 16 and 21 except that the same nonaqueous electrolyte as the nonaqueous electrolyte prepared in Comparative Example 2 was used.

[Test]
(Charge-and-Discharge Cycle Test)
Each of the secondary batteries of Examples 1 to 22 and Comparative Examples 1 to 19 was subjected to the following charge-and-discharge cycle test. Hereinafter, each secondary battery is simply referred to as "battery".

<Charge-and-Discharge Cycle Test at 45° C.>
The battery was placed in a thermostatic chamber at 45° C. In the thermostatic chamber, the battery was subjected to the charge-and-discharge cycle. In charging, the battery was charged at a constant current (CC) of 1 C to a voltage of 3.0 V. That is, constant current (CC) charging was performed. In discharging, the battery was discharged at a constant current (CC) of 1 C to a voltage of 1.5 V. A set of one charge and one discharge was taken to be one charge-and-discharge cycle. This charge-and-discharge cycle was repeated 500 times.

The discharge capacity at 500 charge-and-discharge cycles (discharge capacity in a 500-th cycle) was measured. A ratio (%) of the discharge capacity in a 500-th cycle to the discharge capacity in the initial discharging at 25° C. was taken as a cycle capacity retention at 45° C.

<Charge-and-Discharge Cycle Test at 0° C.>
The battery was placed in a thermostatic chamber at 0° C. In the thermostatic chamber, the battery was subjected to the charge-and-discharge cycle. In charging, the battery was charged at a constant current (CC) of 1 C to a voltage of 3.0 V. That is, constant current (CC) charging was performed. In discharging, the battery was discharged at a constant current (CC) of 1 C to a voltage of 1.5 V. A set of one charge and one discharge was taken to be one charge-and-discharge cycle. This charge-and-discharge cycle was repeated 100 times.

The discharge capacity at 100 charge-and-discharge cycles (discharge capacity in a 100-th cycle) was measured. A ratio (%) of the discharge capacity in a 100-th cycle to the discharge capacity in the initial discharging at 25° C. was taken as a cycle capacity retention at 0° C.

Figure 13:
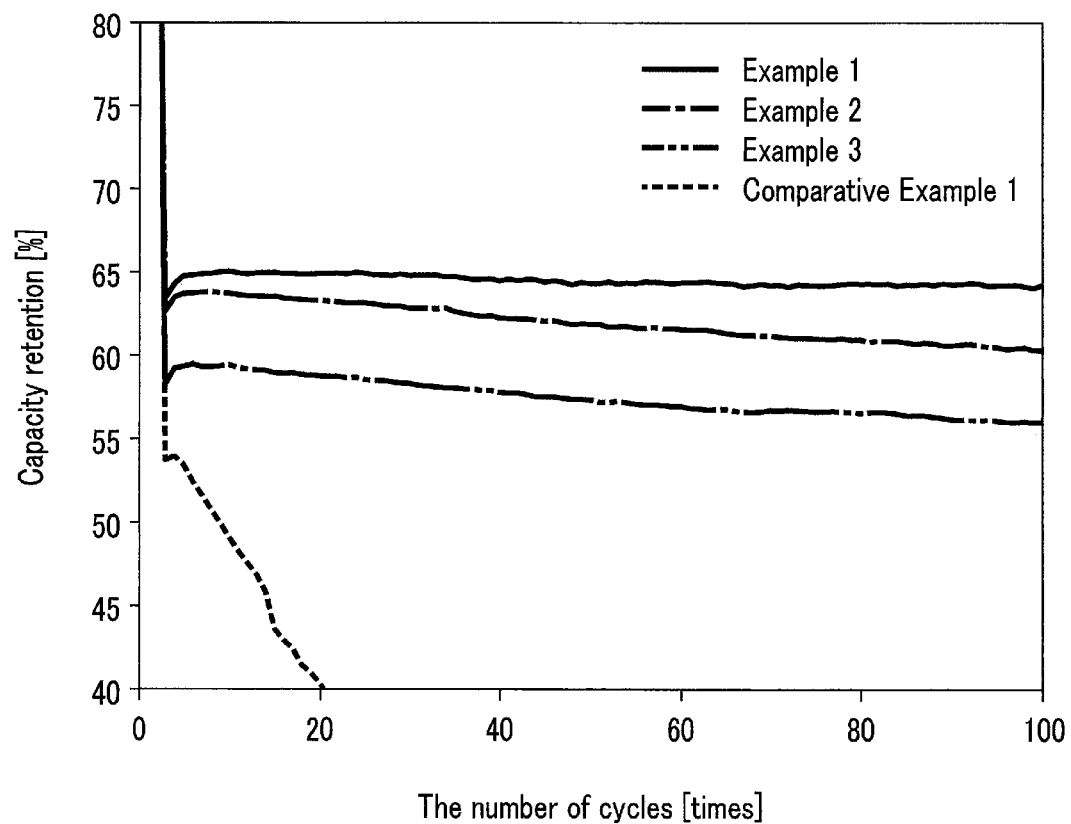
FIG. 13 is a view showing a change in discharge capacity according to charge-and-discharge cycles of secondary batteries of Examples and Comparative Examples.

For each of the secondary batteries of Examples 1 to 3 and Comparative Example 1, the discharge capacity at each charge-and-discharge cycle was measured. FIG. 13 shows a change in the ratio (%) of the discharge capacity to the discharge capacity in the initial discharging at 25° C. as the number of cycles increases for each battery.

The cycle capacity retention at 45° C. and the cycle capacity retention at 0° C. of each of the secondary batteries of Examples 1 to 3 and 17 to 20 and 22 and Comparative Examples 1 to 5 are shown in the following Tables 4 and 9. It is to be noted that the respective capacity retentions shown in Tables 4 and 9 are the capacity retentions with respect to the discharge capacity in the initial discharging at 25° C. Thus, the cycle capacity retention at 0° C. is particularly low as a whole.

A relative value of cycle capacity retention at 45° C. and a relative value of cycle capacity retention at 0° C. of each of the secondary batteries of Examples 4 to 16 and 21 and Comparative Examples 6 to 19 are shown in the following Table 5. In Table 5, the capacity retention of the secondary battery of each Example is described as a relative value with the capacity retention of the secondary battery of the corresponding Comparative Example being 1.

[Confirmation of Layer]
The negative electrodes of the secondary batteries of Examples 1 to 22 and Comparative Examples 1 to 19 were observed by TEM-EDX according to the procedure described above.

The observation showed that the negative electrode of each of the secondary batteries of Examples 1 to 22 contained an active material composite including titanium-containing oxide particles and a layer covering the surface of the titanium-containing oxide particles and containing N and Si. Further, it was found that in the layer of the active material composite of each of the secondary batteries of Examples 1 to 22, a portion close to the surface of the titanium-containing oxide particles contained much N, and a surface portion of the composite contained less N than the portion close to the surface of the titanium-containing oxide particles and much Si. That is, it was found that in the layer of the active material composite of each of the secondary batteries of Examples 1 to 22, in a direction from the surface of the titanium-containing oxide particles to the surface of the composite, the layer had an N concentration gradient decreasing with distance from the titanium-containing oxide particles and a Si concentration gradient increasing with distance from the titanium-containing oxide particles. In other words, the layer of the active material composite of each of the secondary batteries of Examples 1 to 22 included a first surface facing the active material particles containing titanium-containing oxide particles and second surface defining a layer thickness from the first surface, the N concentration in the layer decreased from the first surface to the second surface, and the Si concentration in the layer increased from the first surface to the second surface. Furthermore, it was found that similarly to the active material composite included in each of the secondary batteries of Examples 1 to 22, each of the secondary batteries of Comparative Examples 1, 3, and 4 also included an active material composite including a layer exhibiting the N and Si concentration gradients.

On the other hand, in the negative electrodes of the secondary batteries of Comparative Examples 2 and 6 to 19, no layer containing N and Si was formed on the surface of niobium titanium composite oxide particles as titanium-containing oxide particles.

In the negative electrode of the secondary battery of Comparative Example 5, a layer containing Si was formed on the surface of niobium titanium composite oxide particles as titanium-containing oxide particles. However, in the negative electrode of the secondary battery of Comparative Example 5, N was present only in a small portion of the surface of the niobium titanium composite oxide particles, and N was not present in the formed layer. Thus, distribution of the N concentration in the layer could not be confirmed. The Si concentration in the layer was uniform.

[Measurement of Contents of Silyl Group-Containing Compound and Dicyanate Compound Contained in Nonaqueous Electrolyte]
The contents of the silyl group-containing compound and the dicyanate compound contained in the nonaqueous electrolyte of each of the secondary batteries of Examples 1 to 22 and Comparative Examples 1 to 19 were measured according to the procedure described above.

The contents of the silyl group-containing compound and the dicyanate compound contained in the nonaqueous electrolyte of each of the secondary batteries are shown in the following Tables 4, 5 and 9.

TABLE 4

|  | Concentration A [wt %] | Concentration B [wt %] | B/A | Cycle capacity retention at 45° C. [%] | Cycle capacity retention at 0° C. [%] |
| --- | --- | --- | --- | --- | --- |
| Example 1 | 0.75 | Less than 0.01 | Less than 0.013 | 94 | 64 |
| Example 2 | 0.74 | 0.10 | 0.14 | 94 | 61 |
| Example 3 | 0.76 | 0.25 | 0.33 | 94 | 56 |
| Comparative Example 1 | 0.78 | 0.40 | 0.51 | 94 | 20 |
| Comparative Example 2 | Less than detection limit | Less than detection limit | — | 86 | 64 |
| Example 17 | 0.75 | 0.10 | 0.13 | 93 | 59 |
| Example 18 | 0.74 | 0.15 | 0.20 | 93 | 59 |
| Example 19 | 0.8 | 0.10 | 0.13 | 91 | 56 |
| Example 20 | 0.79 | 0.10 | 0.13 | 92 | 57 |
| Comparative Example 3 | 0.1 | 0.09 | 0.90 | 86 | 64 |
| Comparative Example 4 | 2.1 | 0.1 | 0.05 | 87 | 51 |
| Comparative Example 5 | 0.79 | Less than detection limit | Less than detection limit | 86 | 63 |

TABLE 5

|  | Concentration A [wt %] | Concentration B [wt %] | B/A | Relative value of cycle capacity retention at 45° C. | Relative value of cycle capacity retention at 0° C. |
| --- | --- | --- | --- | --- | --- |
| Example 4 | 0.79 | 0.11 | 0.14 | 1.07 | 0.98 |
| Comparative Example 6 | Less than detection limit | Less than detection limit | — | 1 | 1 |
| Example 5 | 0.75 | 0.11 | 0.15 | 1.05 | 0.96 |
| Comparative Example 7 | Less than detection limit | Less than detection limit | — | 1 | 1 |
| Example 6 | 0.72 | 0.10 | 0.14 | 1.07 | 1.00 |
| Comparative Example 8 | Less than detection limit | Less than detection limit | — | 1 | 1 |
| Example 7 | 0.73 | 0.11 | 0.15 | 1.13 | 0.96 |
| Comparative Example 9 | Less than detection limit | Less than detection limit | — | 1 | 1 |
| Example 8 | 0.73 | 0.12 | 0.16 | 1.07 | 0.95 |
| Comparative Example 10 | Less than detection limit | Less than detection limit | — | 1 | 1 |
| Example 9 | 0.71 | 0.14 | 0.20 | 1.18 | 0.98 |
| Comparative Example 11 | Less than detection limit | Less than detection limit | — | 1 | 1 |
| Example 10 | 0.75 | 0.10 | 0.13 | 1.15 | 0.98 |
| Comparative Example 12 | Less than detection limit | Less than detection limit | — | 1 | 1 |
| Example 11 | 0.8 | 0.18 | 0.23 | 1.05 | 0.99 |
| Comparative Example 13 | Less than detection limit | Less than detection limit | — | 1 | 1 |
| Example 12 | 0.75 | 0.05 | 0.07 | 1.08 | 0.94 |
| Comparative Example 14 | Less than detection limit | Less than detection limit | — | 1 | 1 |
| Example 13 | 0.71 | 0.09 | 0.13 | 1.07 | 0.96 |
| Comparative Example 15 | Less than detection limit | Less than detection limit | — | 1 | 1 |
| Example 14 | 0.71 | 0.09 | 0.13 | 1.03 | 0.95 |
| Comparative Example 16 | Less than detection limit | Less than detection limit | — | 1 | 1 |
| Example 15 | 0.73 | 0.10 | 0.14 | 1.11 | 1.00 |
| Comparative Example 17 | Less than detection limit | Less than detection limit | — | 1 | 1 |
| Example 16 | 0.73 | 0.12 | 0.16 | 1.14 | 0.99 |

TABLE 5-continued

|  | Concentration A [wt %] | Concentration B [wt %] | B/A | Relative value of cycle capacity retention at 45° C. | Relative value of cycle capacity retention at 0° C. |
|---|---|---|---|---|---|
| Comparative Example 18 | Less than detection limit | Less than detection limit | — | 1 | 1 |
| Example 21 | 0.94 | 0.16 | 0.17 | 1.35 | 0.96 |
| Comparative Example 19 | Less than detection limit | Less than detection limit | — | 1 | 1 |

TABLE 6

|  | Negative electrode active material | | | | |
|---|---|---|---|---|---|
|  | Positive electrode active material Composition | Composition | Average secondary particle size [μm] | Specific surface area X [m²/g] | Weight Y [g] |
| Example 22 | Example 1 | Example 1 | Example 1 | Example 1 | Example 1 |

TABLE 7

|  | Silyl group-containing compound | Added amount T [mg] | Diisocyanate compound | Added amount D [mg] |
|---|---|---|---|---|
| Example 22 | Tris-trimethylsilyl phosphate | Example 1 | Example 1 | Example 1 |

TABLE 8

|  | T/(X × Y) | D/(X × Y) | D/T | Charge cut-off potential of negative electrode in initial charging [V (vs. Li/Li⁺)] |
|---|---|---|---|---|
| Example 22 | Example 1 | Example 1 | Example 1 | Example 1 |

TABLE 9

|  | Concentration A [wt %] | Concentration B [wt %] | B/A | Cycle capacity retention at 45° C. [%] | Cycle capacity retention at 0° C. [%] |
|---|---|---|---|---|---|
| Example 22 | 0.75 | Less than 0.01 | Less than 0.013 | 95 | 64 |

[Results]

The results shown in Tables 4 and 9 show that each of the secondary batteries of Examples 1 to 3 and 17 to 20 and 22 could have a cycle capacity retention at 45° C. higher than that of the secondary batteries of Comparative Examples 2 to 5.

Further, the results shown in Tables 4 and 9 show that each of the secondary batteries of Examples 1 to 3 and 17 to 20 and 22 could have a cycle capacity retention at 0° C. higher than that of the secondary batteries of Comparative Examples 1 and 4.

For example, as apparent from FIG. 13, in the charge-and-discharge cycle in a 0° C. environment, in the secondary batteries of Examples 1 to 3, the discharge capacity slightly decreased as the number of charge-and-discharge cycles increased. However, the decrease in capacity was moderate, and the capacity of not less than 56% was maintained even after the secondary batteries were subjected to 100 charge-and-discharge cycles. On the other hand, in the secondary battery of Comparative Example 1, as apparent from FIG. 13, during the charge-and-discharge cycle in a 0° C. environment, the capacity retention decreased to 40% at the 20th discharge, and the capacity retention reached 20% by 100 cycles. That is, the discharge capacity of the secondary battery of Comparative Example 1 sharply decreased as the number of cycles increased. In the secondary battery of Comparative Example 1, it is considered that when the secondary battery is repeatedly subjected to the charge-and-discharge cycle, an excessive layer is further formed on the surface of the active material composite, and the resistance of the negative electrode is increased, so that the negative electrode is deteriorated.

In the secondary battery of Comparative Example 1, the concentration B of the diisocyanate compound in the nonaqueous electrolyte exceeded 0.25% by weight. Thus, in the secondary battery of Comparative Example 1, it is considered that when the secondary battery was repeatedly charged and discharged, an excessive layer was formed on the active material composite. As a result, in the secondary battery of Comparative Example 1, it is considered that the cycle capacity retention at 0° C. was low. As described above, in the secondary battery of Comparative Example 2, a sufficient layer could not be formed on the surface of the active material particles. Thus, in the secondary battery of Comparative Example 2, it is considered that the nonaqueous electrolyte reacted on the surface of the active material particles by the charge-and-discharge cycle at 45° C., and the negative electrode was deteriorated. In the secondary battery of Comparative Example 3, a concentration ratio B/A exceeded 0.5. Thus, in the secondary battery of Comparative Example 3, it is considered that the N concentration on the first surface became too high and the resistance of the negative electrode increased. The electrolytic solution does not contain a sufficient amount of the silyl group-containing compound, and water molecule generated as the secondary battery is charged and discharged cannot be trapped, or the active material is cracked and the layer cannot cover a newly appearing surface. Thus, in the secondary battery of Comparative Example 3, it is considered that the negative electrode was deteriorated by the charge-and-discharge cycle at 45° C. In the secondary battery of Comparative Example 4, it is considered that the silyl group-containing compound in the nonaqueous electrolyte was excessive, and an excessive layer was formed along with charge and discharge. Thus, in the secondary battery of Comparative Example 4, it is considered that the negative electrode was deteriorated by the charge-and-discharge cycle at 45° C. and 0° C. In the secondary battery of Comparative Example 5, as described above, the layer formed on the surface of the niobium titanium composite oxide particles did not contain N. This is probably because in the secondary battery of Comparative Example 5, since the amount of the diisocyanate compound added in the nonaqueous electrolyte was remarkably small, a layer containing N was not formed even by the initial charging and discharging. As a result, in the secondary battery of Comparative Example 5, it is considered that the negative electrode was deteriorated by the charge-and-discharge cycle at 45° C.

From the comparison between Example 1, Comparative Examples 1 and 3 to 5, and Example 21, although they are similar in terms of including a silyl group-containing compound and a diisocyanate compound in the nonaqueous electrolyte, it is found that if the other manufacturing conditions of the secondary battery are different, N and Si concentration distributions in the layer of the active material composite of the negative electrode, the concentration of the silyl group-containing compound in the nonaqueous electrolyte, and/or the concentration of the diisocyanate compound in the nonaqueous electrolyte are different from each other.

The results shown in Table 5 show that in the secondary battery of Example 4, while suppressing reduction in the cycle capacity retention at 0° C., the cycle capacity retention at 45° C. higher than that of the secondary battery of Comparative Example 6 having the same positive electrode active material and negative electrode active material could be exhibited. Further, the results shown in Table 5 show that also in the secondary batteries of Examples 5 to 16 and 21, while suppressing reduction in the cycle capacity retention at 0° C., the cycle capacity retention at 45° C. higher than that of the secondary batteries of the corresponding Comparative Examples 7 to 19 could be exhibited.

The negative electrode of the secondary battery of at least one of the embodiments or Examples includes an active material composite. The active material composite includes active material particles and a layer covering at least a portion of the surfaces of the active material particles. The active material particles include titanium-containing oxide particles. The layer contains N and Si. An N concentration in the layer decreases from the first surface to the second surface. A Si concentration in the layer increases from the first surface to the second surface. The nonaqueous electrolyte contains a silyl group-containing compound containing a trialkylsilyl group and/or a trialkoxysilyl group, and each of the concentrations A and B satisfies the following formula (1): B/A≤0.5; (2) 0 wt %<A≤2.0 wt %; and (3): B≤0.25 wt %. In this secondary battery, while sufficiently suppressing the resistance of the negative electrode, it is possible to sufficiently suppress the reaction between the active material particles and the nonaqueous electrolyte and to suppress gas generation. Consequently, the secondary battery can exhibit excellent cycle life characteristics at low temperature and excellent cycle life characteristics at high temperature.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A secondary battery comprising:
a positive electrode;
a negative electrode comprising an active material composite; and
a nonaqueous electrolyte comprising a silyl group-containing compound comprising a trialkylsilyl group and/or a trialkoxysilyl group, wherein the active material composite comprises active material particles and a layer covering at least a portion of surfaces of the active material particles, and the active material particles comprising titanium-containing oxide particles,
the layer comprises N and Si and comprises a first surface facing the at least the portion of the surfaces of the active material particles and a second surface defining a layer thickness from the first surface,
a N concentration in the layer decreases from the first surface to the second surface,
a Si concentration in the layer increases from the first surface to the second surface, and
the nonaqueous electrolyte satisfies the following formulas (1) to (3):
0<B/A≤0.5 (1)
0 wt %<A≤2.0 wt % (2); and
0 wt %<B<0.01 wt % (3),
wherein A is a concentration [wt %] of the silyl group-containing compound in the nonaqueous electrolyte, and B is a concentration [wt %] of a diisocyanate compound in the nonaqueous electrolyte.

2. The secondary battery according to claim 1, wherein 0.5 wt %≤A≤2.0 wt %.

3. The secondary battery according to claim 1, wherein 0.5 wt %≤A≤2 wt %.

4. The secondary battery according to claim 1, wherein the positive electrode comprises a composite oxide represented by the general formula $Li_xMO_2$, 0<x≤1 in the general formula, and M comprises at least one selected from the group consisting of Ni, Co and Mn.

5. The secondary battery according to claim 1, wherein the titanium-containing oxide particles comprise at least one titanium-containing oxide selected from the group consisting of spinel type lithium-titanium composite oxide, monoclinic P-type titanium-containing oxide, monoclinic niobium titanium composite oxide, orthorhombic titanium-containing composite oxide, ramsdellite type lithium-titanium composite oxide, hollandite type lithium-titanium composite oxide, anatase type titanium-containing oxide, and rutile type titanium-containing oxide.

6. The secondary battery according to claim 1, wherein the active material composite further comprises a carbon-containing layer interposed at least a portion between the active material particles and the layer.

7. The secondary battery according to claim 1, wherein the silyl group-containing compound comprises at least one selected from the group consisting of trimethylsilyl phosphate, triethylsilyl phosphate, tris-trimethylsilyl phosphate, vinyltrimethoxysilane, vinyltriethoxysilane, γ-glycidoxypropyltrimethoxysilane, γ-glycidoxypropyltriethoxysilane, γ-methacryloxypropyltrimethoxysilane, and γ-methacryloxypropyltriethoxysilane.

8. A battery pack comprising the secondary battery according to claim 1.

9. The battery pack according to claim 8, further comprising: an external power distribution terminal; and a protective circuit.

10. The battery pack according to claim 8, comprising plural of the secondary battery, the secondary batteries being electrically connected in series, in parallel, or in a combination of in series and in parallel.

11. A vehicle comprising the battery pack according to claim 8.

12. The vehicle according to claim 11, wherein the battery pack comprises a mechanism configured to convert kinetic energy of the vehicle into regenerative energy.

13. The secondary battery according to claim 1, wherein the silyl group-containing compound comprises a trialkylsilyl group and a trialkoxysilyl group.

14. The secondary battery according to claim 1, wherein the titanium-containing oxide particles are monoclinic niobium titanium composite oxide particles.

* * * * *